United States Patent
Numata et al.

(10) Patent No.: US 11,985,436 B2
(45) Date of Patent: May 14, 2024

(54) IMAGE SENSOR FOR CONVERTING ANALOG PIXEL SIGNAL BASED ON DIFFERENT BIT PRECISIONS, IMAGING DEVICE, ELECTRONIC DEVICE, IMAGE PROCESSING SYSTEM AND SIGNAL PROCESSING METHOD

(71) Applicant: GUANGDONG OPPO MOBILE TELECOMMUNICATIONS CORP., LTD., Dongguan (CN)

(72) Inventors: Hajime Numata, Yokohama (JP); Chiaki Aoyama, Yokohama (JP)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 73 days.

(21) Appl. No.: 17/868,050

(22) Filed: Jul. 19, 2022

(65) Prior Publication Data
US 2022/0360749 A1    Nov. 10, 2022

Related U.S. Application Data

(63) Continuation of application No. PCT/CN2021/071247, filed on Jan. 12, 2021.

(30) Foreign Application Priority Data

Jan. 19, 2020   (CN) .......................... 202010060642.6

(51) Int. Cl.
*H04N 25/13*    (2023.01)
*H04N 25/75*    (2023.01)

(52) U.S. Cl.
CPC ........... *H04N 25/134* (2023.01); *H04N 25/75* (2023.01)

(58) Field of Classification Search
CPC .... H04N 25/134; H04N 25/75; H04N 25/778; H04N 25/78; H04N 25/46; H04N 23/54;
(Continued)

(56) References Cited

U.S. PATENT DOCUMENTS 6,838,651 B1 *   1/2005   Mann ................ H01L 27/14645
                                                              250/226
8,350,940 B2 *   1/2013   Smith .................... H04N 25/46
                                                              348/308
(Continued)

FOREIGN PATENT DOCUMENTS

CN      101079969 A     11/2007
CN      101296304 A     10/2008
(Continued)

OTHER PUBLICATIONS

International Search Report and Written Opinion Dated Apr. 1, 2021 from Application No. PCT/CN2021/071247.
(Continued)

*Primary Examiner* — Ahmed A Berhan
(74) *Attorney, Agent, or Firm* — BAYES PLLC

(57) ABSTRACT

Embodiments of the present disclosure are directed to an image sensor. The image sensor includes a color filter array, a pixel array, and a plurality of analog-to-digital converters (ADCs). The ADCs convert the analog pixel signal obtained by pixels corresponding to first color filters into a digital pixel signal based on a first bit precision and to convert the analog pixel signal obtained by pixels corresponding to second color filters and third color filters into a digital pixel signal based on a second bit precision. The second bit precision is lower than the first bit precision.

20 Claims, 10 Drawing Sheets

(58) Field of Classification Search
CPC ........ H04N 23/55; H04N 23/57; H04N 25/00; H04N 25/70; Y02D 10/00
See application file for complete search history.

(56) References Cited

U.S. PATENT DOCUMENTS

| | | | |
|---|---|---|---|
| 9,686,486 B2* | 6/2017 | Mauritzson | .......... H04N 25/134 |
| 2009/0046186 A1 | 2/2009 | Nagai | |
| 2009/0195683 A1 | 8/2009 | Honda | |
| 2010/0309351 A1 | 12/2010 | Smith et al. | |
| 2011/0019051 A1 | 1/2011 | Yin | |
| 2011/0317039 A1 | 12/2011 | Ise | |
| 2013/0207825 A1 | 8/2013 | Yamazaki | |
| 2015/0271461 A1 | 9/2015 | Hayashi | |
| 2016/0353034 A1 | 12/2016 | Mauritzson et al. | |

FOREIGN PATENT DOCUMENTS

| | | |
|---|---|---|
| CN | 101702753 A | 5/2010 |
| CN | 101753863 A | 6/2010 |
| CN | 103545329 A | 1/2014 |
| CN | 104662885 A | 5/2015 |
| CN | 105578074 A | 5/2016 |
| CN | 109922286 A | 6/2019 |
| EP | 2146498 A2 | 1/2010 |

OTHER PUBLICATIONS

The Second Office Action dated Jan. 12, 2023 from Chinese Application No. 202010060642.6.
The supplementary European search report dated May 4, 2023 from European patent application No. 21740813.7.
The Notice of Allowance dated May 30, 2023 from Chinese patent application No. 202010060642.6.
The First Office Action dated Jul. 28, 2022 from Chinese Application No. 202010060642.6.

* cited by examiner

IMAGE SENSOR FOR CONVERTING ANALOG PIXEL SIGNAL BASED ON DIFFERENT BIT PRECISIONS, IMAGING DEVICE, ELECTRONIC DEVICE, IMAGE PROCESSING SYSTEM AND SIGNAL PROCESSING METHOD

CROSS REFERENCE TO RELATED APPLICATIONS

This application is a continuation of International Application No. PCT/CN2021/071247, filed on Jan. 12, 2021, which claims priority to Chinese Application No. 202010060642.6, filed on Jan. 19, 2020, both of which are incorporated herein by reference in their entireties.

FIELD OF THE DISCLOSURE

The present disclosure relates to an image processing technology, and more particularly, to an image sensor, an imaging device, an electronic device, an image processing system and a signal processing method.

BACKGROUND

In the conventional art, the sensing unit in the image sensor generates an analog pixel signal after receiving a light. The analog pixel signal needs to be converted into a digital signal by an analog-to-digital circuit and then outputted to a processor.

SUMMARY

One objective of an embodiment of the present disclosure is to provide an image sensor, an imagining device, an electronic device, an image processing system and a signal processing method.

According to an embodiment of the present disclosure, an image sensor is disclosed. The image sensor includes a color filter array, a pixel array, and a plurality of analog-to-digital converters (ADCs). The color filter array includes a plurality of first color filters, a plurality of second color filters and a plurality of third color filters. The pixel array includes a plurality of pixels, each of which corresponds to a color filter of the color filter array and is configured to receive light passing through the corresponding color filter to generate an electrical signal to obtain an analog pixel signal. The plurality of ADCs are configured to convert the analog pixel signal obtained by pixels corresponding to the first color filters into a digital pixel signal based on a first bit precision and to convert the analog pixel signal obtained by pixels corresponding to the second color filters and the third color filters into a digital pixel signal based on a second bit precision. The second bit precision is lower than the first bit precision.

According to another embodiment of the present disclosure, an imaging device is disclosed. The imaging device comprises an image sensor. The image sensor includes a color filter array, a pixel array, and a plurality of analog-to-digital converters (ADCs). The color filter array includes a plurality of first color filters, a plurality of second color filters and a plurality of third color filters. The pixel array includes a plurality of pixels, each of which corresponds to a color filter of the color filter array and is configured to receive light passing through the corresponding color filter to generate an electrical signal to obtain an analog pixel signal. The plurality of ADCs are configured to convert the analog pixel signal obtained by pixels corresponding to the first color filters into a digital pixel signal based on a first bit precision and to convert the analog pixel signal obtained by pixels corresponding to the second color filters and the third color filters into a digital pixel signal based on a second bit precision. The second bit precision is lower than the first bit precision.

According to still another embodiment of the present disclosure, an electronic device is disclosed. The electronic device comprises an imaging device. The imaging device comprises an image sensor. The image sensor includes a color filter array, a pixel array, and a plurality of analog-to-digital converters (ADCs). The color filter array includes a plurality of first color filters, a plurality of second color filters and a plurality of third color filters. The pixel array includes a plurality of pixels, each of which corresponds to a color filter of the color filter array and is configured to receive light passing through the corresponding color filter to generate an electrical signal to obtain an analog pixel signal. The plurality of ADCs are configured to convert the analog pixel signal obtained by pixels corresponding to the first color filters into a digital pixel signal based on a first bit precision and to convert the analog pixel signal obtained by pixels corresponding to the second color filters and the third color filters into a digital pixel signal based on a second bit precision. The second bit precision is lower than the first bit precision.

According to yet another embodiment of the present disclosure, an image processing method is disclosed. The image processing method is operable in an image sensor. The image sensor comprises a color filter array, a pixel array and a plurality of ADCs. The color filter array comprises a plurality of first color filters, a plurality of second color filters and a plurality of third color filters. The pixel array comprises a plurality of pixels, each of which corresponds to a color filter of the color filter array and is configured to receive light passing through the corresponding color filter to generate an electrical signal to obtain an analog pixel signal. The signal processing method comprises: controlling the plurality of ADCs to convert the analog pixel signal obtained by pixels corresponding to the first color filters into a digital pixel signal based on a first bit precision and to convert the analog pixel signal obtained by pixels corresponding to the second color filters and the third color filters into a digital pixel signal based on a second bit precision, which is lower than the first bit precision.

Additional aspects and advantages of embodiments of the present application will be set forth, in part, in the following description, and in part will be apparent from the following description, or learned by practice of the present disclosure.

BRIEF DESCRIPTION OF THE DRAWINGS

The above and/or additional aspects and advantages of the present application will become apparent and readily understood from the following description of embodiments taken in conjunction with the accompanying drawings.

DETAILED DESCRIPTION

Figure 1:
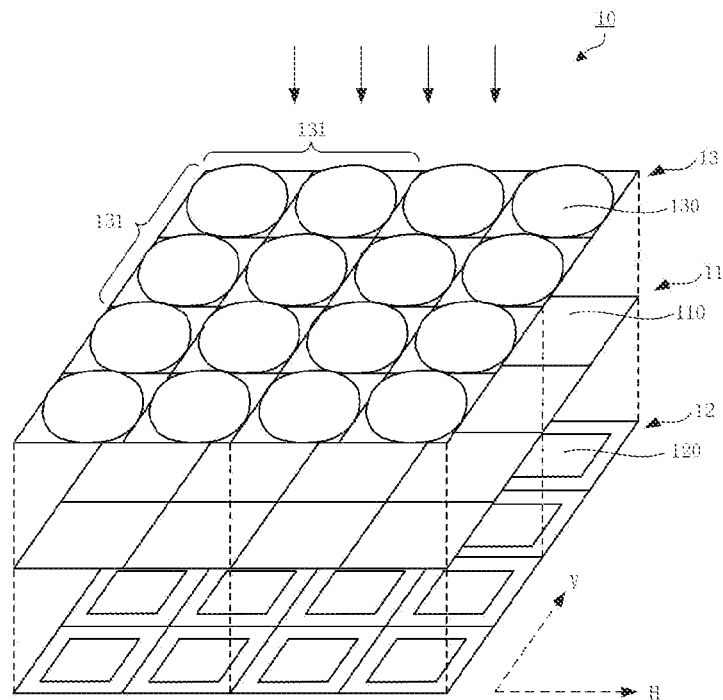
FIG. 1 and FIG. 2 depict a part of an image sensor according to some embodiments of the present disclosure.

Embodiments of the present disclosure are described in detail below, examples of which are illustrated in the accompanying drawings, where the same or similar reference numerals refer to the same or similar elements or elements having the same or similar functions throughout. The embodiments described below with reference to the accompanying drawings are exemplary, only used to explain the embodiments of the present disclosure, and should not be construed as limitations on the embodiments of the present disclosure. In the drawings, the size and relative sizes of layers and regions may be exaggerated for clarity.

According to an embodiment of the present disclosure, the image sensor includes a color filter array, a pixel array, and a plurality of analog-to-digital converters (ADCs). The color filter array includes a plurality of first color filters, a plurality of second color filters and a plurality of third color filters. The pixel array includes a plurality of pixels, each of which corresponds to a color filter of the color filter array and is configured to receive light passing through the corresponding color filter to generate an electrical signal to obtain an analog pixel signal. The plurality of ADCs are configured to convert the analog pixel signal obtained by pixels corresponding to the first color filters into a digital pixel signal based on a first bit precision and to convert the analog pixel signal obtained by pixels corresponding to the second color filters and the third color filters into a digital pixel signal based on a second bit precision. The second bit precision is lower than the first bit precision.

In some embodiments, the color filter array comprises a plurality of color filter sets, each of the color filter set comprises color filters of at least two different colors and the color filters in each of the color filter sets corresponding to each of the two different colors are plural. The pixel array further comprises a plurality of floating diffusion nodes. The color filters of a same color in a same color filter set shares one floating diffusion node such that the electrical signals generated by the pixels corresponding to the color filters of the same color in the same color filter set are combined at the floating diffusion node.

In some embodiments, the plurality of color filter sets comprises a plurality of first color filter sets and a plurality of second color filter set. The first color filter set comprises the first color filters and the second color filters of a same number, and the second color filter set comprises the first color filters and the third color filters of a same number. The electrical signals generated by pixels corresponding to the plurality of first color filters in each of the first color filter set are combined at a floating diffusion node shared by the pixels corresponding to the plurality of first color filters to generate a first analog pixel signal. The electrical signals generated by pixels corresponding to the plurality of second color filters in each of the first color filter set are combined at a floating diffusion node shared by the pixels corresponding to the plurality of first color filters to generate a third analog pixel signal. The electrical signals generated by pixels corresponding to the plurality of first color filters in each of the second color filter set are combined at a floating diffusion node shared by the pixels corresponding to the plurality of first color filters to generate a second analog pixel signal. The electrical signals generated by pixels corresponding to the plurality of third color filters in each of the second color filter set are combined at a floating diffusion node shared by the pixels corresponding to the plurality of second color filters to generate a fourth analog pixel signal.

In some embodiments, in a same color filter set, pixels corresponding to the color filters of all colors share a same floating diffusion node, and each of the pixels comprises an exposure control circuit. In the same color filter set, control ends of exposure control circuits of the pixels corresponding to the color filters of the same color are simultaneously turned on to transfer charges generated by the pixels corresponding to the color filters of the same color in the same color filter set after receiving light to the floating diffusion node shared by the pixels corresponding to the color filters of the same color. In the same color filter set, control ends of exposure control circuits of pixels corresponding to color filters of different colors are turned on at different time.

In some embodiments, the color filter matrix comprises a plurality of regions. Each of the regions comprises at least one color filter set. In each of the regions, pixels corresponding to all of the first color filters share an ADC of the plurality of ADCs. Each of the ADCs is configured to convert the first analog signal and/or the second analog signal of the pixels corresponding to all of the first color filters in each of the regions to a first digital pixel signal. In each of the regions, pixels corresponding to all of the second color filters share an ADC of the plurality of ADCs. Each of the ADCs is configured to convert the third analog signal of the pixels corresponding to all of the second color filters in each of the regions to a second digital pixel signal and/or pixels corresponding to all of the third color filters share an ADC of the plurality of ADCs. Each of the ADCs is configured to convert the fourth analog signal of the pixels corresponding to all of the third color filters in each of the regions to a third digital pixel signal.

In some embodiments, each of the regions comprises at least one first color filter set and at least one color filter set. Pixels corresponding to the first color filters, the second color filters and the third color filters in each of the regions share an ADC. The pixel array further comprises a plurality of selection circuits. One selection circuit is electrically connected to one of the floating diffusion nodes and the shared ADC. In a same region, control ends of the selection circuits corresponding to pixels corresponding to different color filter sets are turned on at different time. In a same color filter set, control ends of the selection circuits corresponding to the pixels corresponding to different color filter sets are turned on at different time.

In some embodiments, the first color filter is a green color filter, the second color filter is a red color filter, and the third color filter is a blue color filter.

In some embodiments, the image sensor further comprises a micro lens array. The micro lens array, the color filter array and the pixel array are orderly arranged along a light receiving direction of the image sensor.

According to another embodiment of the present disclosure, an imaging device comprising the image sensor as disclosed in the above embodiments is provided.

In some embodiments, the imaging device further comprises a processor, configured to process a first digital pixel signal representing a value of a first color channel of a light applied to pixels corresponding to the first color filters, to process a second digital pixel signal representing a value of a second color channel of a light applied to pixels corresponding to the second color filters, and to process a third digital pixel signal representing a value of a third color channel of a light applied to pixels corresponding to the third color filter, to generate a color image.

According to another embodiment of the present disclosure, an electronic device comprising an imaging device. The imaging device includes the image sensor as disclosed in the above embodiments is provided.

According to another embodiment of the present disclosure, a signal processing method operable in an image sensor is provided. The image sensor includes a color filter array, a pixel array and a plurality of ADCs. The color filter array includes a plurality of first color filters, a plurality of second color filters and a plurality of third color filters. The pixel array comprises a plurality of pixels, each of which corresponds to a color filter of the color filter array and is configured to receive light passing through the corresponding color filter to generate an electrical signal to obtain an analog pixel signal. The signal processing method includes controlling the plurality of analog-to-digital converters (ADCs) to convert the analog pixel signal obtained by pixels corresponding to the first color filters into a digital pixel signal based on a first bit precision and to convert the analog pixel signal obtained by pixels corresponding to the second color filters and the third color filters into a digital pixel signal based on a second bit precision, which is lower than the first bit precision.

In some embodiments, the color filter array comprises a plurality of color filter sets, each of the color filter set comprises color filters of at least two different colors and the color filters in each of the color filter set corresponding to each of the two different colors are plural. The pixel array further comprises a plurality of floating diffusion nodes, the color filters of a same color in a same color filter set shares one floating diffusion node. The signal processing method further includes: controlling the electrical signals generated by the pixels corresponding to the color filters of the same color in the same color filter set to be combined at the floating diffusion node.

In some embodiments, the signal processing method further includes: processing a first digital pixel signal representing a value of a first color channel of a light applied to pixels corresponding to the first color filters, processing a second digital pixel signal representing a value of a second color channel of a light applied to pixels corresponding to the second color filters, and processing a third digital pixel signal representing a value of a third color channel of a light applied to pixels corresponding to the third color filters, to generate a color image.

Figure 3:
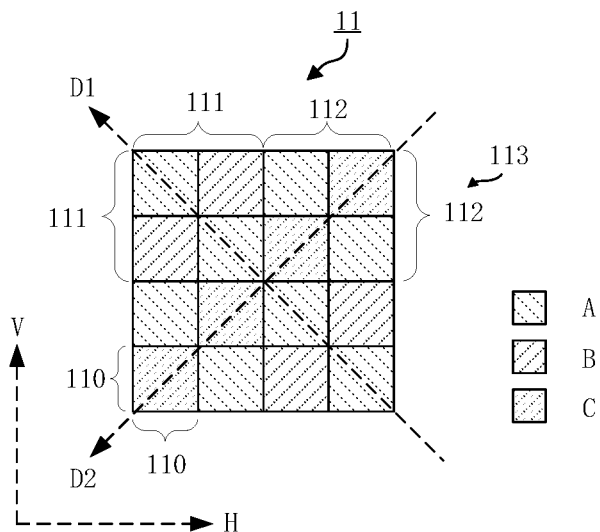
FIGS. 3-6 depict distributions of part of color filters in the image sensor shown in FIG. 1 or FIG. 2.
Figure 7:
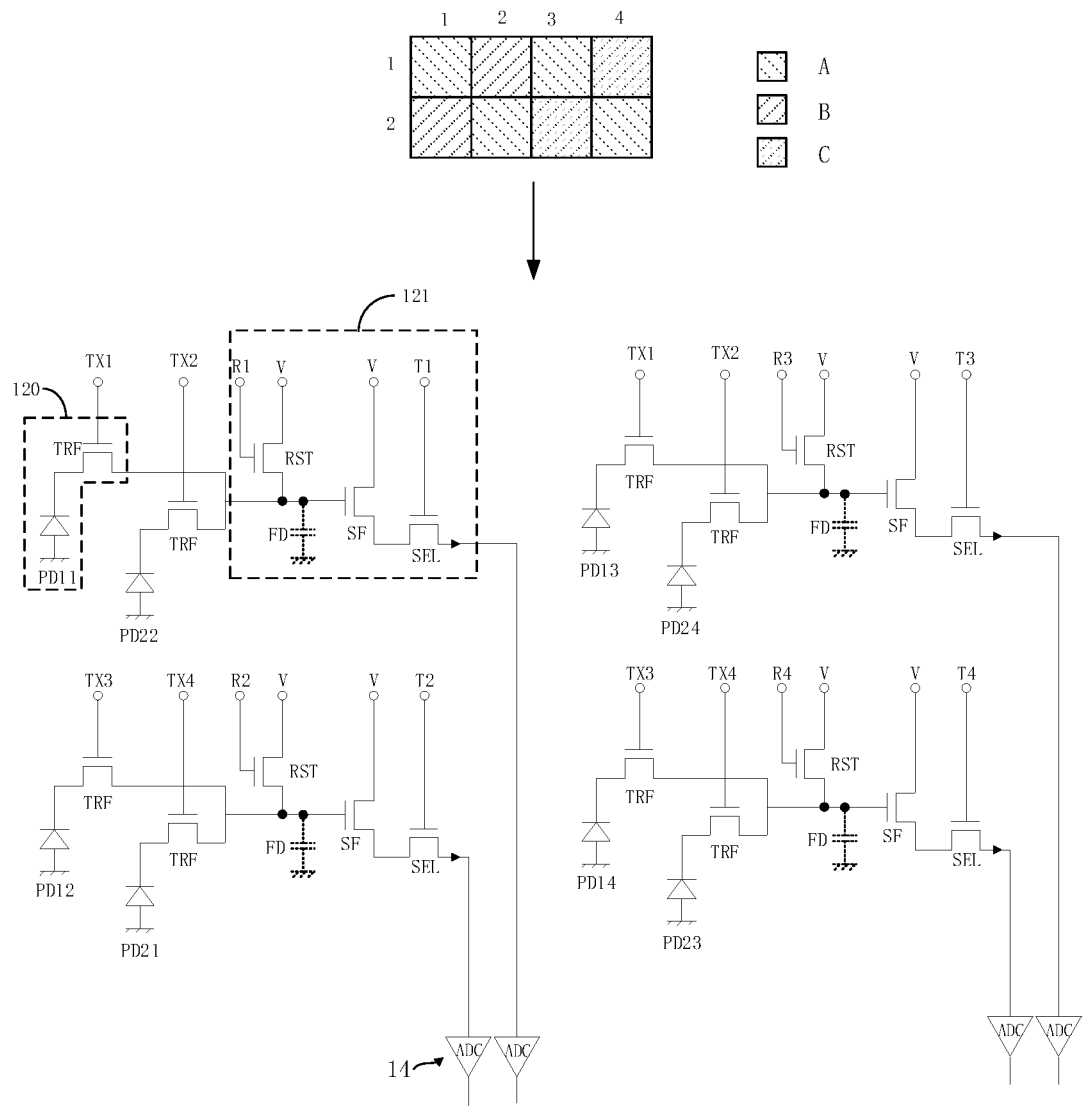
FIG. 7 depicts a circuit of an image sensor according to an embodiment of the present disclosure.

Please refer to FIG. 1, FIG. 3 and FIG. 7. The image sensor 10 comprises a color filter array 11, a pixel array 12 and a plurality of ADCs 14. The color filter array 11 comprises a plurality of first color filters A, a plurality of second color filters B and a plurality of third color filters C. The pixel array 12 comprises a plurality of pixels 120. Each of the pixels 120 corresponds to a color filter 111 of the color filter array 11. The pixel 120 is configured to receive the light passing the corresponding color filter 11 to generate an analog pixel signal. The ADC 14 converts the analog pixel signal obtained by pixels 120 corresponding to the first color filters A into a digital pixel signal based on a first bit precision and converts the analog pixel signal obtained by pixels 120 corresponding to the second color filters B and the third color filters C into a digital pixel signal based on a second bit precision. The second bit precision is lower than the first bit precision.

In the following disclosure, the image sensor 10 will be further illustrated in coordination with the figures.

Figure 2:
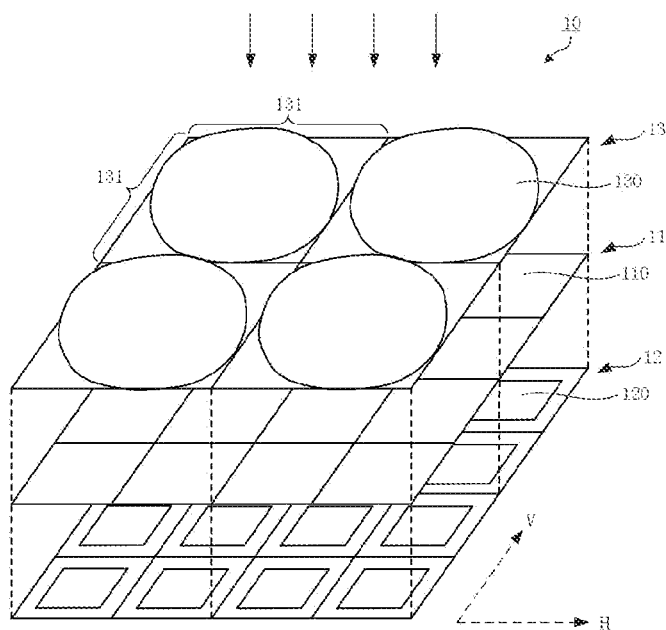

Please refer to FIG. 1 and FIG. 2. The image sensor 10 comprises a micro lens array 13, a color filter array 11 and a pixel array 12. The micro lens array 13, the color filter array 11 and the pixel array 12 are orderly arranged along the light receiving direction of the image sensor 10.

The color filter array 11 comprises a plurality of color filter sets 113. Each of the color filter set 113 comprises color filters 110 of at least two different colors. The color filters 110 of each of the colors in each of the color filter sets 113 are plural. Specifically, the plurality of color filter sets 113 could comprises a first color filter set 111 and a plurality of second color filter sets 112. The first color filter set 111 comprises a plurality of first color filters A and a plurality of second color filters B of the same number. The second color filter set 112 comprises a plurality of first color filters A and a plurality of third color filters C of the same number.

The pixel array 12 comprises a plurality of pixels 120 and a plurality of floating diffusion nodes FD (as shown in FIG. 7). Each of the pixels corresponds to a color filter 110 of the color filter array 11. The pixel 120 is configured to receive light passing through the color filter 11 to generate an electrical signal. The pixels 120 corresponding to the color filters 110 of the same color in the same color filter set 113 shares one floating diffusion node FD such that the electrical signals generated by the pixels 120 corresponding to the color filters 110 of the same color in the same color filter set 113 are combined at the floating diffusion node FD.

The micro lens array 13 comprises a plurality of micro lens sets 131. One micro lens set 131 in the micro lens array 13 corresponds to a color filter set 113 (the first color filter set 111 or the second color filter set 112) and corresponds to the pixels 120 corresponding to the color filter set 113. In an embodiment, as shown in FIG. 1, each micro lens set 131 comprises a plurality of micro lens 130. Each micro lens 130 corresponds to a color filter 110 and a pixel 120. In another embodiment, as shown in FIG. 2, each micro lens set 131 comprises a micro lens 130. Each micro lens 130 corresponds to a color filter set 113 and corresponds to the pixels corresponding to the color filter set 113.

FIGS. 3-6 depict distributions of part of color filters 110 of the color filter set 11. In the color filters 11 shown in FIGS. 3-6, each color filter 11 comprises a plurality of first color filter sets 111 and a plurality of second color filter sets 112. Each first color filter set 111 comprises a plurality of the first color filters A and a plurality of second color filters 111 of the same number. Each second color filter set 112 comprises a plurality of first color filters A and a plurality of third color filter C of the same number.

Here, the color composition of the first color filters A, the second color filters B and the third color filters C could be various. For example, the first color filters A could be green color filters G, the second color filters B could be red color filters R and third color filters C could be blue color filters Bu. Or, the first color filters A could be yellow color filters Y, the second color filters B could be red color filters R and third color filters C could be blue color filters Bu. Please note, the color composition of the first color filters A, the second color filters B and the third color filters C is not limited to the above-mentioned examples.

Here, the first color filter sets 111 could be arranged along the first diagonal direction D1. The second color filters 112 could be arranged along the second diagonal direction D2. The first diagonal direction D1 is different from the second diagonal direction D2. In an example, when the first color filter sets 111 are arranged along the first diagonal direction D1 and the second color filter sets 112 are arranged along the second diagonal direction D2, the first color filter sets 111 and the second color filter sets 112 could be adjacently arranged along the horizontal and vertical directions.

Here, the number of the color filters 110 in the first color filter 111 is N*N. The number of the color filters 110 in the second color filters 112 is also N*N. N is an integer greater than or equal to 2. Here, N is not limited and could be 2, 3, 4, 5, 6, 7, 8, 9, 10, 15, 20 or another number.

The arrangement of the color filters 110 in each first color filter 111 could be (1) please refer to FIG. 3, multiple first color filters A and multiple second color filters B are adjacently arranged along the vertical and horizontal directions in the image sensor 10 (as shown in FIG. 1); (2) please refer to FIG. 4, multiple color filters 110 are arranged in columns and the color filters 110 in the same column have the same color; or (3) multiple color filters 110 are arranged in rows. Multiple color filters 110 in the same row have the same color. Surely, the arrangement of the color filters 110 in each first color filter set 111 is not limited to the above examples.

The color filters 110 in the second color filter set 112 could be: (1) please refer to FIG. 3, multiple first color filters A and multiple third color filters C are adjacently arranged along the vertical and horizontal directions in the image sensor 10 (as shown in FIG. 1); (2) please refer to FIG. 4, multiple color filters 110 are arranged in columns and the color filters 110 in the same column have the same color; or (3) multiple color filters 110 are arranged in rows. Multiple color filters 110 in the same row have the same color. Surely, the arrangement of the color filters 110 in each first color filter set 112 is not limited to the above examples.

FIG. 3 depicts a distribution of a part of color filters 110 in a color filter array 11 according to an embodiment of the present disclosure. Please refer to FIG. 3, the distribution of the part of color filters 110 is:

| A | B | A | C |
|---|---|---|---|
| B | A | C | A |
| A | C | A | B |
| C | A | B | A |

Here, A is the first color filter, B is the second color filter and C is the third color filter. The number of the color filters 110 in each first color filter set 111 is 2*2. The number of the color filters 110 in each second color filter set 112 is 2*2.

As shown in FIG. 3, the first filter sets 111 are arranged along the first diagonal direction D1 (such as the direction connecting top left corner to the bottom right corner of the color filter array 11 shown in FIG. 3) and the second filter sets 112 are arranged along the second diagonal direction D2 (such as the direction connecting the bottom left corner to the top right corner of the color filter array 11 shown in FIG. 3). The first diagonal direction D1 is different from the second diagonal direction D2. For example, the first diagonal direction D1 is orthogonal to the second diagonal direction D2.

It should be noted that the first diagonal direction D1 and the second diagonal direction D2 are not limited to the diagonals. They could include the directions parallel to the diagonals. The term "direction" does not mean only one specific direction and should be understood as the concept of "line", which means it could have two opposite directions of a line. In another embodiment, the first diagonal direction D1 could be the direction connecting the bottom left corner to the top right corner and the second diagonal direction D2 could be the direction connecting the top left corner to the bottom right corner. In this case, the positions of the first color filter sets 111 and the second color filter sets 112 are adjusted according to the adjustments of the first diagonal direction D1 and the second diagonal direction D2.

As shown in FIG. 3, the first color filter sets 111 and the second color filter sets 112 are adjacently arranged in the vertical direction V and the horizontal direction H in the image sensor 10 (shown in FIG. 1). That is, the color filter sets 113 are periodically arranged in an order of the first color filter sets 111 and the second color filter sets 112 along the vertical direction V and the horizontal direction H.

It should be noted that the first color filter sets 111 and the second color filter sets 112 are adjacently arranged in the vertical direction V and the horizontal direction H in the image sensor 10 but their arrangement is not limited to the arrangement shown in FIG. 3. Actually, the color filter sets 113 could be periodically arranged in an order of the first color filter sets 111 and the second color filter sets 112 or in an order of the second color filter sets 112 and the first color filter sets 111 (from left to right and/or from top to bottom). Multiple color filter sets 113 are periodically arranged in an order of the first color filter sets 111 and the second color filter sets 112 or in an order of the second color filter sets 112 and the first color filter sets 111 (from left to right and/or from top to bottom) in the horizontal direction H.

As shown in FIG. 3, in the first color filter sets 111, the first color filters A and the second color filters B are adjacently arranged in the vertical direction V and the horizontal direction H. That is, along the vertical direction V, the first color filters A and the second color filters B are alternatively arranged. Along the horizontal direction H, the first color filters A and the second color filters B are alternatively arranged. In the second color filter sets 112, the first color filters A and the third color filters C are adjacently arranged in the vertical direction V and the horizontal direction H. That is, along the vertical direction V, the first color filters A and the third color filters C are alternatively arranged. Along the horizontal direction H, the first color filters A and the third color filters C are alternatively arranged.

In some embodiments, a part of the color filters 110 in the color filter array 11 could be arranged as follows:

| | | | | | |
|---|---|---|---|---|---|
| A | B | A | A | C | A |
| B | A | B | C | A | C |
| A | B | A | A | C | A |
| A | C | A | A | B | A |
| C | A | C | B | A | B |
| A | C | A | A | B | A |

Here, A is the first color filter. B is the second color filter. C is the third color filter. The number of the first color filters 110 of each first color filter set 111 is 3*3. The number of the second color filters 110 of each first color filter set 112 is 3*3.

In this arrangement, the first filter sets 111 are arranged along the first diagonal direction D1 (such as the direction connecting top left corner to the bottom right corner of the color filter array 11) and the second filter sets 112 are arranged along the second diagonal direction D2 (such as the direction connecting the bottom left corner to the top right corner of the color filter array 11). The first diagonal direction D1 is different from the second diagonal direction D2. For example, the first diagonal direction D1 is orthogonal to the second diagonal direction D2.

In this arrangement, the first color filter sets 111 and the second color filter sets 112 are adjacently arranged in the vertical direction V and the horizontal direction H in the image sensor 10 (shown in FIG. 1). That is, the color filter sets 113 are periodically arranged in an order of the first color filter sets 111 and the second color filter sets 112 or the second color filter sets 112 and the first color filter sets 111 along the vertical direction V. The color filter sets 113 are periodically arranged in an order of the first color filter sets 111 and the second color filter sets 112 or the second color filter sets 112 and the first color filter sets 111 along the horizontal direction H.

In this arrangement, in the first color filter sets 111, the first color filters A and the second color filters B are adjacently arranged in the vertical direction V and the horizontal direction H. That is, along the vertical direction V, the first color filters A and the second color filters B are alternatively arranged. Along the horizontal direction H, the first color filters A and the second color filters B are alternatively arranged. In the second color filter sets 112, the first color filters A and the third color filters C are adjacently arranged in the vertical direction V and the horizontal direction H. That is, along the vertical direction V, the first color filters A and the third color filters C are alternatively arranged. Along the horizontal direction H, the first color filters A and the third color filters C are alternatively arranged.

In some embodiments, the part of color filters 110 in the color filter array 11 could be arranged as:

| | | | | | | | |
|---|---|---|---|---|---|---|---|
| A | B | A | B | A | C | A | C |
| B | A | B | A | C | A | C | A |
| A | B | A | B | A | C | A | C |
| B | A | B | A | C | A | C | A |
| A | C | A | C | A | B | A | B |
| C | A | C | A | B | A | B | A |
| A | C | A | C | A | B | A | B |
| C | A | C | A | B | A | B | A |

Here, A is the first color filter. B is the second color filter. C is the third color filter. The number of the first color filters 110 of each first color filter set 111 is 4*4. The number of the second color filters 110 of each first color filter set 112 is 4*4

In this arrangement, the first filter sets 111 are arranged along the first diagonal direction D1 (such as the direction connecting top left corner to the bottom right corner of the color filter array 11) and the second filter sets 112 are arranged along the second diagonal direction D2 (such as the direction connecting the bottom left corner to the top right corner of the color filter array 11). The first diagonal direction D1 is different from the second diagonal direction D2. For example, the first diagonal direction D1 is orthogonal to the second diagonal direction D2.

In this arrangement, the first color filter sets 111 and the second color filter sets 112 are adjacently arranged in the vertical direction V and the horizontal direction H in the image sensor 10 (shown in FIG. 1). That is, the color filter sets 113 are periodically arranged in an order of the first color filter sets 111 and the second color filter sets 112 or the second color filter sets 112 and the first color filter sets 111 along the vertical direction V. The color filter sets 113 are periodically arranged in an order of the first color filter sets 111 and the second color filter sets 112 or the second color filter sets 112 and the first color filter sets 111 along the horizontal direction H.

In this arrangement, in the first color filter sets 111, the first color filters A and the second color filters B are adjacently arranged in the vertical direction V and the horizontal direction H. That is, along the vertical direction V, the first color filters A and the second color filters B are alternatively arranged. Along the horizontal direction H, the first color filters A and the second color filters B are alternatively arranged. In the second color filter sets 112, the first color filters A and the third color filters C are adjacently arranged in the vertical direction V and the horizontal direction H. That is, along the vertical direction V, the first color filters A and the third color filters C are alternatively arranged. Along the horizontal direction H, the first color filters A and the third color filters C are alternatively arranged.

Figure 4:
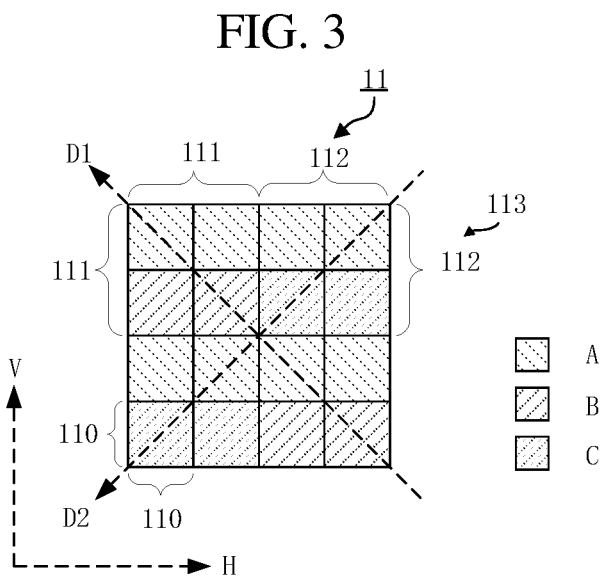

FIG. 4 depicts a distribution of a part of color filters 110 in a color filter array 11 according to another embodiment of the present disclosure. Please refer to FIG. 4, the distribution of the part of color filters 110 is:

| | | | |
|---|---|---|---|
| A | A | A | A |
| B | B | C | C |
| A | A | A | A |
| C | C | B | B |

Here, A is the first color filter, B is the second color filter and C is the third color filter. The number of the color filters 110 in each first color filter set 111 is 2*2. The number of the color filters 110 in each second color filter set 112 is 2*2.

As shown in FIG. 4, the first filter sets 111 are arranged along the first diagonal direction D1 (such as the direction connecting top left corner to the bottom right corner of the color filter array 11 shown in FIG. 4) and the second filter sets 112 are arranged along the second diagonal direction D2 (such as the direction connecting the bottom left corner to the top right corner of the color filter array 11 shown in FIG. 4). The first diagonal direction D1 is different from the second diagonal direction D2. For example, the first diagonal direction D1 is orthogonal to the second diagonal direction D2.

As shown in FIG. 4, the first color filter sets 111 and the second color filter sets 112 are adjacently arranged in the vertical direction V and the horizontal direction H in the image sensor 10 (shown in FIG. 1). That is, the color filter sets 113 are periodically arranged in an order of the first color filter sets 111 and the second color filters B or an order of the along the vertical direction V and the horizontal direction H.

As shown in FIG. 4, in the first color filter set 111, the color filters 110 are arranged in rows and multiple color filters 110 in the same row have the same color. For example, the color filters 110 in the first row are all first color filters A, and the color filters 110 in the second row are all second color filters B. In the second color filter set 112, the color filters 110 are arranged in rows and multiple color filters 110 in the same row have the same color. For example, the color filters 110 in the first row are all first color filters A, and the color filters 110 in the second row are all third color filters C.

In some embodiments, a part of the color filters 110 in the color filter array 11 could be arranged as follows:

| A | A | A | A | A | A |
|---|---|---|---|---|---|
| B | B | B | C | C | C |
| A | A | A | A | A | A |
| A | A | A | A | A | A |
| C | C | C | B | B | B |
| A | A | A | A | A | A |

Here, A is the first color filter, B is the second color filter and C is the third color filter. The number of the color filters 110 in each first color filter set 111 is 2*2. The number of the color filters 110 in each second color filter set 112 is 2*2.

In this arrangement, the first filter sets 111 are arranged along the first diagonal direction D1 (such as the direction connecting top left corner to the bottom right corner of the color filter array 11) and the second filter sets 112 are arranged along the second diagonal direction D2 (such as the direction connecting the bottom left corner to the top right corner of the color filter array 11). The first diagonal direction D1 is different from the second diagonal direction D2. For example, the first diagonal direction D1 is orthogonal to the second diagonal direction D2.

In this arrangement, the first color filter sets 111 and the second color filter sets 112 are adjacently arranged in the vertical direction V and the horizontal direction H in the image sensor 10 (shown in FIG. 1). That is, the color filter sets 113 are periodically arranged in an order of the first color filter sets 111 and the second color filters B or an order of the along the vertical direction V and the horizontal direction H.

In this arrangement, in the first color filter set 111, the color filters 110 are arranged in rows and multiple color filters 110 in the same row have the same color. For example, the color filters 110 in the first row are all first color filters A, the color filters 110 in the second row are all second color filters B, and the color filters 110 in the third row are all second color filters A. In the second color filter set 112, the color filters 110 are arranged in rows and multiple color filters 110 in the same row have the same color. For example, the color filters 110 in the first row are all first color filters A, the color filters 110 in the second row are all third color filters C, and the color filters 110 in the third row are all second color filters A.

In some embodiments, the part of the color filters 110 in the color filter array 11 could be arranged as:

| A | A | A | A | A | A | A | A |
|---|---|---|---|---|---|---|---|
| B | B | B | B | C | C | C | C |
| A | A | A | A | A | A | A | A |
| C | C | C | C | B | B | B | B |
| A | A | A | A | A | A | A | A |
| C | C | C | C | B | B | B | B |

Here, A is the first color filter. B is the second color filter. C is the third color filter. The number of the first color filters 110 of each first color filter set 111 is 4*4. The number of the second color filters 110 of each first color filter set 112 is 4*4

In this arrangement, the first filter sets 111 are arranged along the first diagonal direction D1 (such as the direction connecting top left corner to the bottom right corner of the color filter array 11) and the second filter sets 112 are arranged along the second diagonal direction D2 (such as the direction connecting the bottom left corner to the top right corner of the color filter array 11). The first diagonal direction D1 is different from the second diagonal direction D2. For example, the first diagonal direction D1 is orthogonal to the second diagonal direction D2.

In this arrangement, the first color filter sets 111 and the second color filter sets 112 are adjacently arranged in the vertical direction V and the horizontal direction H in the image sensor 10 (shown in FIG. 1). That is, the color filter sets 113 are periodically arranged in an order of the first color filter sets 111 and the second color filters B or an order of the along the vertical direction V and the horizontal direction H.

In this arrangement, in the first color filter set 111, the color filters 110 are arranged in rows and multiple color filters 110 in the same row have the same color. For example, the color filters 110 in the first row are all first color filters A, the color filters 110 in the second row are all second color filters B, the color filters 110 in the third row are all first color filters A, and the color filters in the fourth row are all second color filters B. In the second color filter set 112, the color filters 110 are arranged in rows and multiple color filters 110 in the same row have the same color. For example, the color filters 110 in the first row are all first color filters A, the color filters 110 in the second row are all third color filters C, the color filters 110 in the third row are all first color filters A, and the color filters in the fourth row are all third color filters C.

Figure 5:
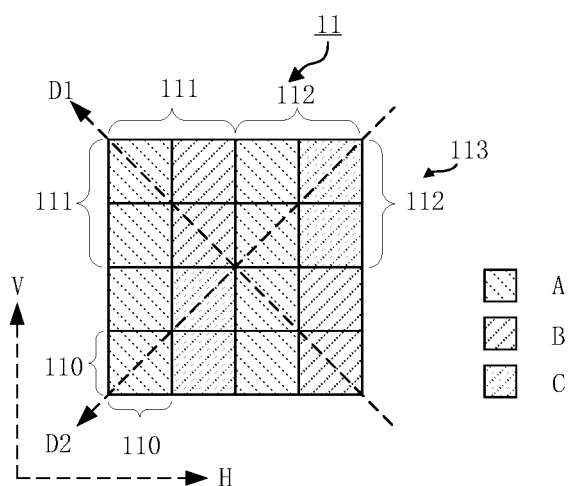

FIG. 5 depicts a distribution of a part of color filters 110 in a color filter array 11 according to another embodiment of the present disclosure. Please refer to FIG. 5, the distribution of the part of color filters 110 is:

| A | B | A | C |
|---|---|---|---|
| A | B | A | C |
| A | C | A | B |
| A | C | A | B |

Here, A is the first color filter, B is the second color filter and C is the third color filter. The number of the color filters 110 in each first color filter set 111 is 2*2. The number of the color filters 110 in each second color filter set 112 is 2*2.

As shown in FIG. 5, the first filter sets 111 are arranged along the first diagonal direction D1 (such as the direction connecting top left corner to the bottom right corner of the color filter array 11 shown in FIG. 4) and the second filter sets 112 are arranged along the second diagonal direction D2 (such as the direction connecting the bottom left corner to the top right corner of the color filter array 11 shown in FIG.

4). The first diagonal direction D1 is different from the second diagonal direction D2. For example, the first diagonal direction D1 is orthogonal to the second diagonal direction D2.

As shown in FIG. 5, the first color filter sets 111 and the second color filter sets 112 are adjacently arranged in the vertical direction V and the horizontal direction H in the image sensor 10 (shown in FIG. 1). That is, the color filter sets 113 are periodically arranged in an order of the first color filter sets 111 and the second color filters B or an order of the along the vertical direction V and the horizontal direction H.

As shown in FIG. 5, in the first color filter set 111, the color filters 110 are arranged in columns and multiple color filters 110 in the same column have the same color. For example, the color filters 110 in the first column are all first color filters A, and the color filters 110 in the second column are all second color filters B. In the second color filter set 112, the color filters 110 are arranged in columns and multiple color filters 110 in the same column have the same color. For example, the color filters 110 in the first column are all first color filters A, and the color filters 110 in the second column are all third color filters C.

In some embodiments, a part of the color filters 110 in the color filter array 11 could be arranged as follows:

| A | B | A | A | C | A |
|---|---|---|---|---|---|
| A | B | A | A | C | A |
| A | B | A | A | C | A |
| A | C | A | A | B | A |
| A | C | A | A | B | A |
| A | C | A | A | B | A |

Here, A is the first color filter, B is the second color filter and C is the third color filter. The number of the color filters 110 in each first color filter set 111 is 3*3. The number of the color filters 110 in each second color filter set 112 is 3*3.

In this arrangement, the first filter sets 111 are arranged along the first diagonal direction D1 (such as the direction connecting top left corner to the bottom right corner of the color filter array 11) and the second filter sets 112 are arranged along the second diagonal direction D2 (such as the direction connecting the bottom left corner to the top right corner of the color filter array 11). The first diagonal direction D1 is different from the second diagonal direction D2. For example, the first diagonal direction D1 is orthogonal to the second diagonal direction D2.

In this arrangement, the first color filter sets 111 and the second color filter sets 112 are adjacently arranged in the vertical direction V and the horizontal direction H in the image sensor 10 (shown in FIG. 1). That is, the color filter sets 113 are periodically arranged in an order of the first color filter sets 111 and the second color filters B or an order of the along the vertical direction V and the horizontal direction H.

In this arrangement, in the first color filter set 111, the color filters 110 are arranged in columns and multiple color filters 110 in the same column have the same color. For example, the color filters 110 in the first column are all first color filters A, the color filters 110 in the second column are all second color filters B, and the color filters 110 in the third column are all first color filters A. In the second color filter set 112, the color filters 110 are arranged in columns and multiple color filters 110 in the same column have the same color. For example, the color filters 110 in the first column are all first color filters A, and the color filters 110 in the second column are all third color filters C and the color filters 110 in the third column are all first color filters A.

In some embodiments, the part of color filters 110 in the color filter array 11 could be arranged as:

| A | B | A | B | A | C | A | C |
|---|---|---|---|---|---|---|---|
| A | B | A | B | A | C | A | C |
| A | B | A | B | A | C | A | C |
| A | B | A | B | A | C | A | C |
| A | C | A | C | A | B | A | B |
| A | C | A | C | A | B | A | B |
| A | C | A | C | A | B | A | B |
| A | C | A | C | A | B | A | B |

Here, A is the first color filter. B is the second color filter. C is the third color filter. The number of the first color filters 110 of each first color filter set 111 is 4*4. The number of the second color filters 110 of each first color filter set 112 is 4*4

In this arrangement, the first filter sets 111 are arranged along the first diagonal direction D1 (such as the direction connecting top left corner to the bottom right corner of the color filter array 11) and the second filter sets 112 are arranged along the second diagonal direction D2 (such as the direction connecting the bottom left corner to the top right corner of the color filter array 11). The first diagonal direction D1 is different from the second diagonal direction D2. For example, the first diagonal direction D1 is orthogonal to the second diagonal direction D2.

In this arrangement, the first color filter sets 111 and the second color filter sets 112 are adjacently arranged in the vertical direction V and the horizontal direction H in the image sensor 10 (shown in FIG. 1). That is, the color filter sets 113 are periodically arranged in an order of the first color filter sets 111 and the second color filters B or an order of the along the vertical direction V and the horizontal direction H.

In this arrangement, in the first color filter set 111, the color filters 110 are arranged in columns and multiple color filters 110 in the same column have the same color. For example, the color filters 110 in the first column are all first color filters A, the color filters 110 in the second column are all second color filters B, the color filters 110 in the third column are all first color filters A, and the color filters in the fourth column are all second color filters B. In the second color filter set 112, the color filters 110 are arranged in columns and multiple color filters 110 in the same column have the same color. For example, the color filters 110 in the first column are all first color filters A, the color filters 110 in the second column are all third color filters C, the color filters 110 in the third column are all first color filters A, and the color filters in the fourth column are all third color filters C.

Figure 6:
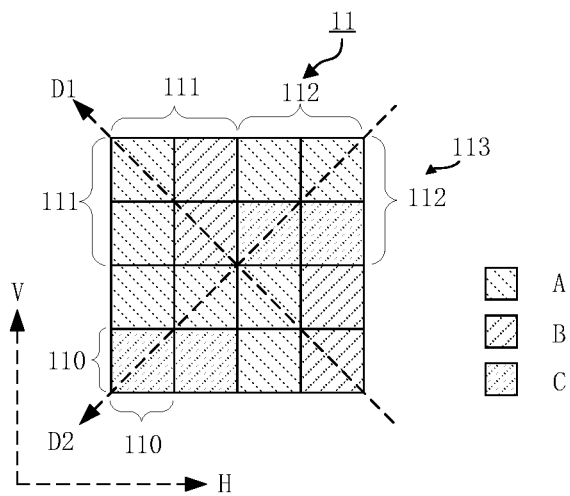

FIG. 6 depicts a distribution of a part of color filters 110 in a color filter array 11 according to another embodiment of the present disclosure. Please refer to FIG. 6, the distribution of the part of color filters 110 is:

| A | B | A | A |
|---|---|---|---|
| A | B | C | C |
| A | A | A | B |
| C | C | A | B |

Here, A is the first color filter, B is the second color filter and C is the third color filter. The number of the color filters 110 in each first color filter set 111 is 2*2. The number of the color filters 110 in each second color filter set 112 is 2*2.

As shown in FIG. 6, the first filter sets 111 are arranged along the first diagonal direction D1 (such as the direction connecting top left corner to the bottom right corner of the color filter array 11 shown in FIG. 4) and the second filter sets 112 are arranged along the second diagonal direction D2 (such as the direction connecting the bottom left corner to the top right corner of the color filter array 11 shown in FIG. 4). The first diagonal direction D1 is different from the second diagonal direction D2. For example, the first diagonal direction D1 is orthogonal to the second diagonal direction D2.

As shown in FIG. 6, the first color filter sets 111 and the second color filter sets 112 are adjacently arranged in the vertical direction V and the horizontal direction H in the image sensor 10 (shown in FIG. 1). That is, the color filter sets 113 are periodically arranged in an order of the first color filter sets 111 and the second color filters B or an order of the along the vertical direction V and the horizontal direction H.

As shown in FIG. 6, in the first color filter set 111, the color filters 110 are arranged in columns and multiple color filters 110 in the same column have the same color. For example, the color filters 110 in the first column are all first color filters A, and the color filters 110 in the second column are all second color filters B. In the second color filter set 112, the color filters 110 are arranged in rows and multiple color filters 110 in the same row have the same color. For example, the color filters 110 in the first row are all first color filters A, and the color filters 110 in the second row are all third color filters C.

In some embodiments, a part of the color filters 110 in the color filter array 11 could be arranged as follows:

| A | A | A | A | C | A |
| B | B | B | A | C | A |
| A | A | A | A | C | A |
| A | C | A | A | A | A |
| A | C | A | B | B | B |
| A | C | A | A | A | A |

Here, A is the first color filter, B is the second color filter and C is the third color filter. The number of the color filters 110 in each first color filter set 111 is 3*3. The number of the color filters 110 in each second color filter set 112 is 3*3.

In this arrangement, the first filter sets 111 are arranged along the first diagonal direction D1 (such as the direction connecting top left corner to the bottom right corner of the color filter array 11) and the second filter sets 112 are arranged along the second diagonal direction D2 (such as the direction connecting the bottom left corner to the top right corner of the color filter array 11). The first diagonal direction D1 is different from the second diagonal direction D2. For example, the first diagonal direction D1 is orthogonal to the second diagonal direction D2.

In this arrangement, the first color filter sets 111 and the second color filter sets 112 are adjacently arranged in the vertical direction V and the horizontal direction H in the image sensor 10 (shown in FIG. 1). That is, the color filter sets 113 are periodically arranged in an order of the first color filter sets 111 and the second color filters B or an order of the along the vertical direction V and the horizontal direction H.

In this arrangement, in the first color filter set 111, the color filters 110 are arranged in rows and multiple color filters 110 in the same row have the same color. For example, the color filters 110 in the first row are all first color filters A, the color filters 110 in the second row are all second color filters B, and the color filters 110 in the row column are all first color filters A. In the second color filter set 112, the color filters 110 are arranged in columns and multiple color filters 110 in the same column have the same color. For example, the color filters 110 in the first column are all first color filters A, and the color filters 110 in the second column are all third color filters C and the color filters 110 in the third column are all first color filters A.

In some embodiments, the part of color filters 110 in the color filter array 11 could be arranged as:

| A | B | A | B | A | A | A | A |
| A | B | A | B | C | C | C | C |
| A | B | A | B | A | A | A | A |
| A | B | A | B | C | C | C | C |
| A | A | A | A | A | B | A | B |
| C | C | C | C | A | B | A | B |
| A | A | A | A | A | B | A | B |
| C | C | C | C | A | B | A | B |

Here, A is the first color filter. B is the second color filter. C is the third color filter. The number of the first color filters 110 of each first color filter set 111 is 4*4. The number of the second color filters 110 of each first color filter set 112 is 4*4

In this arrangement, the first filter sets 111 are arranged along the first diagonal direction D1 (such as the direction connecting top left corner to the bottom right corner of the color filter array 11) and the second filter sets 112 are arranged along the second diagonal direction D2 (such as the direction connecting the bottom left corner to the top right corner of the color filter array 11). The first diagonal direction D1 is different from the second diagonal direction D2. For example, the first diagonal direction D1 is orthogonal to the second diagonal direction D2.

In this arrangement, the first color filter sets 111 and the second color filter sets 112 are adjacently arranged in the vertical direction V and the horizontal direction H in the image sensor 10 (shown in FIG. 1). That is, the color filter sets 113 are periodically arranged in an order of the first color filter sets 111 and the second color filters B or an order of the along the vertical direction V and the horizontal direction H.

In this arrangement, in the first color filter set 111, the color filters 110 are arranged in columns and multiple color filters 110 in the same column have the same color. For example, the color filters 110 in the first column are all first color filters A, the color filters 110 in the second column are all second color filters B, the color filters 110 in the third column are all first color filters A, and the color filters in the fourth column are all second color filters B. In the second color filter set 112, the color filters 110 are arranged in rows and multiple color filters 110 in the same row have the same color. For example, the color filters 110 in the first row are all first color filters A, the color filters 110 in the second row are all third color filters C, the color filters 110 in the third row are all first color filters A, and the color filters in the fourth row are all third color filters C.

Please refer to FIG. 1 and FIG. 7. In the image sensor 10 according to an embodiment of the present disclosure, the electrical signals generated by the pixels 120 corresponding to each first color filter set 111 could be combined to generate a first analog pixel signal and a third analog pixel signal, and the electrical signals generated by the pixels 120 corresponding to each second color filter set 112 could be combined to generate a second analog pixel signal and a fourth analog pixel signal. Here, the electrical signals generated by pixels 120 corresponding to the first color filters A in each first color filter set 111 are combined at the floating diffusion node FD shared by the pixels 120 corresponding to the first color filters A in the first color filter set 111 to generate a first analog pixel signal. The electrical signals generated by pixels 120 corresponding to the second color filters B in each first color filter set 111 are combined at the floating diffusion node FD shared by the pixels 120 corresponding to the second color filters B in the first color filter set 111 to generate a third analog pixel signal. The electrical signals generated by pixels 120 corresponding to the first color filters A in each second color filter set 112 are combined at the floating diffusion node FD shared by the pixels 120 corresponding to the first color filters A in the second color filter set 112 to generate a second analog pixel signal. The electrical signals generated by pixels 120 corresponding to the third color filters C in each second color filter set 112 are combined at the floating diffusion node FD shared by the pixels 120 corresponding to the third color filters C in the second color filter set 112 to generate a fourth analog pixel signal.

Specifically, in an example, in the same color filter 113, the pixels corresponding to the color filters of the same color share the same floating diffusion node FD and the pixels corresponding to the color filters of the different colors correspond to different floating diffusion nodes PD. Please refer to FIG. 1, FIG. 3 and FIG. 7. Each pixel 120 comprises photoelectric devices (such as PD11/PD12/PD13/PD14/PD21/PD22/PD23/PD24) and an exposure control circuit TRF. The pixel array 12 further comprises a reading circuit 121. Each reading circuit 121 comprises a reset circuit RST, a floating diffusion node FD, an amplifying circuit SF and a selection circuit SEL. The floating diffusion node FD is connected to the reset circuit RST and the amplifying circuit SF. The selection circuit SEL is connected to the amplifying circuit SF. As shown in FIG. 1, FIG. 3 and FIG. 7, in the first color filter set 111, the two pixels 120 (including the pixels of PD11 and PD22) corresponding to the two first color filters A shares a reading circuit 121. The two pixels 120 (the pixels including PD12 and PD21) corresponding to the two second color filters B shares a reading circuit 121. Furthermore, the reading circuit 121 shared by the two pixels 120 (including the pixels of PD11 and PD22) corresponding to the two first color filters A is different from the reading circuit 121 shared by the two pixels 120 (the pixels including PD12 and PD21) corresponding to the two second color filters B. In the first color filter set 111, the exposure control circuits TRF of the two pixels 120 corresponding to the two first color filters A are both connected to the corresponding floating diffusion node FD. The exposure control circuits TRF of the two pixels 120 corresponding to the two second color filters B are both connected to the corresponding floating diffusion node FD. As shown in FIG. 1, FIG. 3 and FIG. 7, in the second color filter set 112, the two pixels 120 (including the pixels of PD13 and PD24) corresponding to the two first color filters A shares a reading circuit 121. The two pixels 120 (the pixels including PD14 and PD23) corresponding to the two third color filters C shares a reading circuit 121. Furthermore, the reading circuit 121 shared by the two pixels 120 corresponding to the two first color filters A is different from the reading circuit 121 shared by the two pixels 120 corresponding to the two third color filters C. In the second color filter set 112, the exposure control circuits TRF of the two pixels 120 corresponding to the two first color filters A are both connected to the corresponding floating diffusion node FD. The exposure control circuits TRF of the two pixels 120 corresponding to the third second color filters C are both connected to the corresponding floating diffusion node FD.

When the pixel array 12 is working, the control ends TX of the exposure control circuits TRF of the pixels 120 corresponding to the color filters 110 of the same color in the same color filter set 113 are turned on at the same time such that the charges generated by the pixels 120 corresponding to the color filters of the same color in the same color filter 113 after receiving light are transferred to the floating diffusion node FD shared by the pixels 120 corresponding to the color filters 110 of the same color in the same color filter set 113. In the same color filter set 113, the control ends TX of the exposure control circuits TRF of the pixels 120 corresponding to the color filters 110 of different colors are turned on at the same time or at different time. Specifically, as shown in FIG. 1, FIG. 3, FIG. 7, FIG. 8A and FIG. 8B, in the first color filter set 111, the reset circuit RST performs a reset operation on the floating diffusion node FD shared by the two pixels (the pixels including PD11 and PD22) corresponding to the two first color filters A. And then, the control end T1 of the selection circuit SET shared by the two pixels 120 corresponding to the two first color filters A is turned on to output a reset voltage level at the corresponding floating diffusion node FD. And then, the control end TX1 of the exposure control circuit TRF of one pixel 120 (the pixel including PD11) corresponding one first color filter A and the control end TX2 of the exposure control circuit TRF of another pixel 120 (the pixel including PD22) corresponding another first color filter A are turned on at the same time. Accordingly, the charges generated by one pixel 120 corresponding to one first color filter A after receiving light are transferred to the floating diffusion node FD shared by the two pixels 120 corresponding to the two color filters A. Furthermore, the charges generated by another pixel 120 corresponding to another first color filter A after receiving light are also transferred to the floating diffusion node FD shared by the two pixels 120 corresponding to the two first color filters A. In this way, the charges generated by the two pixels 120 corresponding to the two first color filters A are combined at the floating diffusion node PD. The amplifying circuit SF amplifies the electrical signal corresponding to the accumulated charges at the floating diffusion node FD to obtain a first analog pixel signal. When the control end T1 of the selection circuit SET shared by the two pixels 120 corresponding to the two first color filters A is turned on again, the first analog signal is outputted to the corresponding ADC 14. Similarly, in the first color filter 111, the reset circuit RST performs a reset operation on the floating diffusion node FD shared by the two pixels (the pixels including PD12 and PD21) corresponding to the two second color filters B. And then, the control end T2 of the selection circuit SET shared by the two pixels 120 corresponding to the two second color filters B is turned on to output a reset voltage level at the corresponding floating diffusion node FD. And then, the control end TX3 of the exposure control circuit TRF of one pixel 120 (the pixel including PD12) corresponding one second color filter B and the control end TX4 of the exposure control circuit TRF of another pixel 120 (the pixel including PD21) corresponding another second color filter B are turned on at the same time. Accordingly, the charges generated by one pixel 120 corresponding to one second color filter B after receiving light are transferred to the floating diffusion node FD shared by the two pixels 120 corresponding to the two second color filters B. Furthermore, the charges generated by another pixel 120 corresponding to another first second color filter B after receiving light are also transferred to the floating diffusion node FD shared by the two pixels 120 corresponding to the two second color filters B. In this way, the charges generated by the two pixels 120 corresponding to the two second color filter B are combined at the floating diffusion node FD. The amplifying circuit SF amplifies the electrical signal corresponding to the accumulated charges at the floating diffusion node FD to obtain a third analog pixel signal. When the control end T2 of the selection circuit SET shared by the two pixels 120 corresponding to the two second color filters B is turned on again, the third analog signal is outputted to the corresponding ADC 14. The electrical signals generated by the two pixels 120 (the pixels including PD13 and PD24) corresponding to the two first color filters A and the two pixels 120 (the pixels including PD14 and PD23) corresponding to the two third color filters C in the second color filter set 112 are combined in a similar way. Further illustrations are omitted here for simplicity.

Figure 8A:
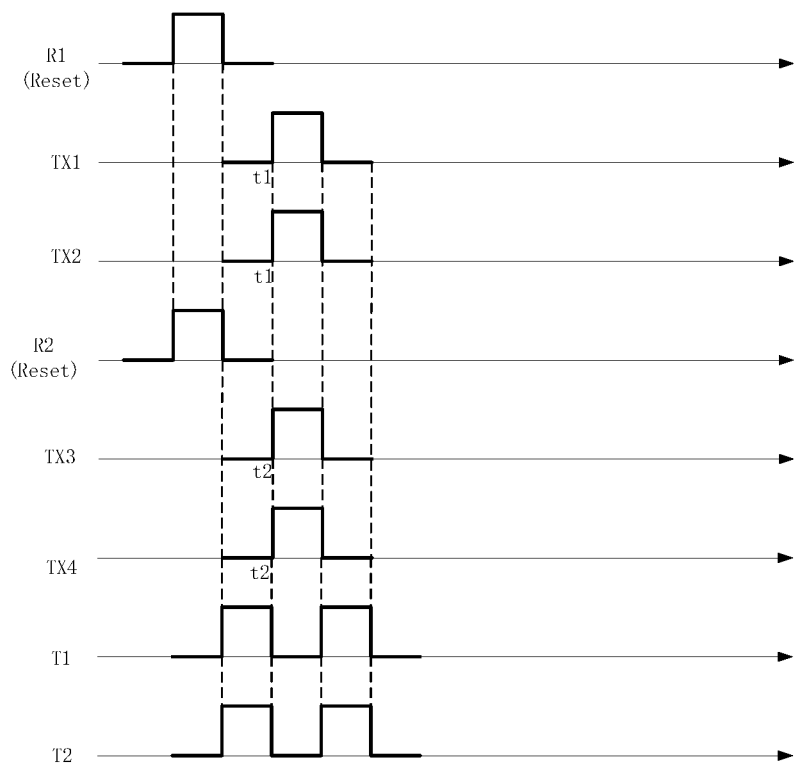
FIG. 8A and FIG. 8B depict waveforms for explaining the working mechanism of an image sensor according to some embodiments of the present disclosure.
Figure 8B:
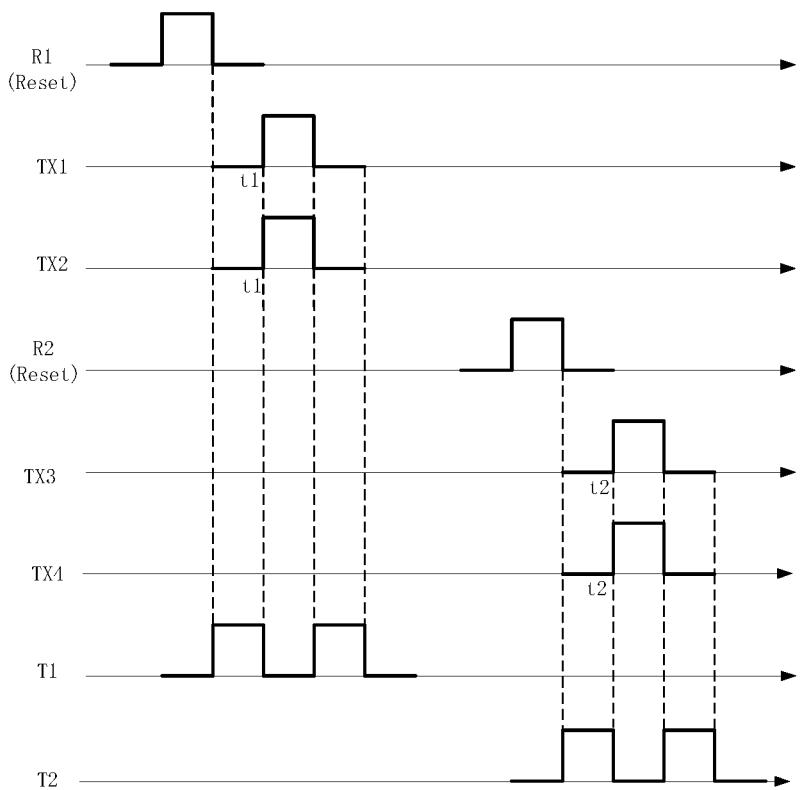

In the same color filter set 113, the pixels corresponding to different colors use different floating diffusion nodes FD. Therefore, when the electrical signals are combined, the control ends TX of the exposure control circuits of the pixels 120 corresponding to the color filters 110 of different colors could be turned on at the same time or at different time. In an embodiment, in the first color filter set 110, the control ends TX1 and TX2 of the exposure control circuits of the two pixels 120 corresponding to the two first color filters A are turned on at the time t1 and the control ends TX3 and TX4 of the exposure control circuits TRF of the two pixels corresponding to the second color filters B are turned on at the time t2. Here, t1 could be the same as t2 (as shown in FIG. 8A) or be different from t2 (as shown in FIG. 8B). Specifically, as shown in FIG. 8A, when t1=t2, in the first color filter set 111, the control ends T1, T2, T3 and T4 of the exposure control circuits TRF of the four pixels 120 corresponding to four color filters 110 are turned on at the same time such that the electrical signals generated by the two pixels 120 corresponding to the first color filters A are transferred to the floating diffusion node FD shared by the two pixel 120 and the electrical signals generated by the two pixels 120 corresponding to the second color filters B are transferred to the floating diffusion node FD shared by the two pixel 120. As shown in FIG. 8B, when t1≠2, in the first color filter set 111, the control ends TX1 and TX2 of the exposure control circuits TRF of the two pixels 120 corresponding to the two first color filters A are first turned on at the time t1 such that the electrical signals generated by the two pixels 120 corresponding to the two first color filters A are transferred to the floating diffusion node FD shared by the two pixels 120. And then, the control ends TX3 and TX4 of the exposure control circuits TRF of the two pixels 120 corresponding to the two second color filters B are simultaneously turned on at the time t2 such that the electrical signals generated by the two pixels 120 corresponding to the two second color filters B are transferred to the floating diffusion node FD shared by the two pixels 120. It should be noted that in another embodiment, the control ends TX3 and TX4 of the exposure control circuits TRF of the two pixels 120 corresponding to the two second color filters B could be turned on first and then the control ends TX1 and TX2 of the exposure control circuits TRF of the two pixels 120 corresponding to the two first color filters A are turned on. This change also falls within the scope of the present disclosure.

Figure 9:
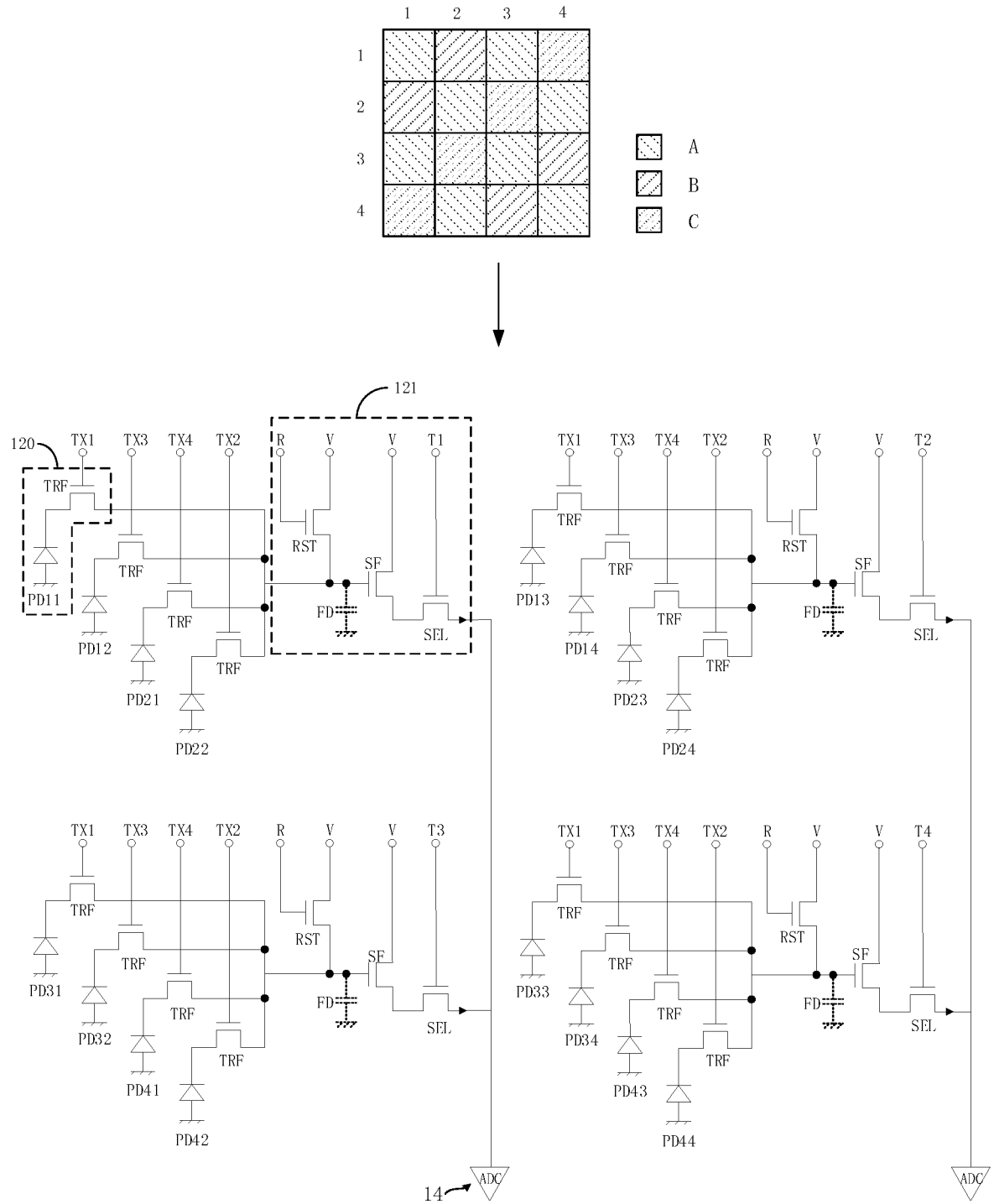
FIG. 9 depicts a circuit of an image sensor according to an embodiment of the present disclosure.

In another embodiment, in the same color filter set 113, the pixels corresponding to the color filters 110 of all colors share a same floating diffusion node FD. Each pixel 120 comprises an exposure control circuit TRF. Please refer to FIG. 1 and FIG. 9. Each pixel 120 comprises a photoelectrical device (such as PD11/PD12/PD13/PD14/PD21/PD22/PD23/PD24/PD31/PD32/PD33/PD34/PD41/PD42/PD43/PD44) and an exposure control circuit TRF. The pixel array 12 further comprises reading circuits 121. Each reading circuit 121 comprises a reset circuit RST, a floating diffusion node FD, an amplifying circuit SF and a selection circuit SE. The floating diffusion node FD is connected to the reset circuit RST and the amplifying circuit SF. The selection circuit SEL is connected to the amplifying circuit SF. As shown in FIG. 1, FIG. 3 and FIG. 9, in each first color filter set 111, the two pixels 120 (the pixels including PD11 and PD22) corresponding to two first color filters A and the two pixels 120 (the pixels including PD12 and PD21) corresponding to two second color filters B share a reading circuit 121. In the first color filer set 111, the exposure control circuit TRF of the two pixels 120 corresponding to the two first color filters A and the exposure control circuit TRF of the two pixels 120 corresponding to the two second color filters B are both connected to the floating diffusion node FD of one reading circuit 121. As shown in FIG. 1, FIG. 3 and FIG. 9, in each second color filter set 112, the two pixels 120 (the pixels including PD13 and PD24) corresponding to two first color filters A and the two pixels 120 (the pixels including PD14 and PD23) corresponding to two third color filters C share a reading circuit 121. In the second color filer set 112, the exposure control circuit TRF of the two pixels 120 corresponding to the two first color filters A and the exposure control circuit TRF of the two pixels 120 corresponding to the two third color filters C are both connected to the floating diffusion node FD of one reading circuit 121.

When the pixel array 12 is working, in the same color filter 113, the control ends TX of the exposure control circuits TRF of the pixels 120 of the same color are turned on at the same time to transfer the charges generated by the pixels 120 corresponding to the color filters 110 of the same color after receiving light to the floating diffusion node FD shared by the pixels. In the same color filter set 13, the control ends of the exposure control circuits of the pixels 120 corresponding to the color filters 10 of different colors. Specifically, as shown in FIG. 1, FIG. 3, FIG. 0 and FIG. 10, for each first color filter set 111, the reset circuit RST performs a reset operation on the floating diffusion node FD shared by the four pixels 120 corresponding to the four color filters 110 in the first color filter set 111. And then, the control end T1 of the selection circuit SEL of the two pixels 120 (the pixels including PD11 and PD22) corresponding to the two first color filters A is turned on to output the reset voltage level at the corresponding floating diffusion node FD. And then, at the time t1, the control end TX1 of the exposure control circuit TRF of one pixel 120 (the pixel including PD11) corresponding to one color filter A and the control end TX2 of the exposure control circuit TRF of another pixel 120 (the pixel including PD22) corresponding to another color filter A are turned on at the same time. Accordingly, the charges generated by one pixel 120 (the pixel including PD11) corresponding to one first color filter A are transferred to the floating diffusion node FD shared by four pixels 120 (the pixels including PD11, PD12, PD21 and PD22) in the first color filter 11. The charges generated by another pixel 120 (the pixel including PD22) corresponding to another first color filter A are transferred to the floating diffusion node FD shared by four pixels 120 in the first color filter set 111. In this way, the charges generated by the two pixels 120 corresponding to the first color filters A are combined at the floating diffusion node FD shared by the fourth pixels 120. The amplifying circuit SF amplifies the electrical signals corresponding to the charges at the floating diffusion node FD to obtain a first analog pixel signal. When the control end T1 of the selection circuit SET shared by the two pixels 120 corresponding to the two first color filters A is turned on again, the first analog signal is outputted to the corresponding ADC 14. After the first analog pixel signal is outputted to the ADC 14, the reset circuit RST again performs the reset operation on the floating diffusion node FD shared by the fourth pixels 120 corresponding to four color filters 110 in the first color filter set 111. And then, the control end T1 of the selection circuit SEL of two pixels 120 (the pixels including PD12 and PD21) corresponding to two second color filters B is turned on to output the reset voltage level at the corresponding floating diffusion node FD. And then, at the time t2 (t1 is before t2), the control end TX3 of the exposure control circuit TRF of one pixel 120 (the pixel including PD12) corresponding to one second color filter B in the first color filter set and the control end TX4 of the exposure control circuit TRF of another pixel 120 (the pixel including PD21) corresponding to another second color filter B in the first color filter set 111 are turned on at the same time. Accordingly, the charges generated by one pixel 120 (the pixel including PD12) corresponding to one second color filter B are transferred to the floating diffusion node FD shared by four pixels 120 (the pixels including PD11, PD12, PD21 and PD22) in the first color filter set 111. The charges generated by another pixel 120 (the pixel including PD21) corresponding to another second color filter B are transferred to the floating diffusion node FD shared by four pixels 120 in the first color filter 11. In this way, the charges generated by the two pixels 120 corresponding to the second color filters B are combined at the floating diffusion node FD shared by the fourth pixels 120. The amplifying circuit SF amplifies the electrical signals corresponding to the charges at the floating diffusion node FD to obtain a third analog pixel signal. When the control end T1 of the selection circuit SET shared by the two pixels 120 corresponding to the two second color filters B is turned on again, the third analog signal is outputted to the corresponding ADC 14. In the second color filter set 112, the electrical signals generated by the two pixels 120 (the pixels including PD13 and PD24) corresponding to two first color filters A are combined in a similar way and the electrical signals generated by the two pixels 120 (the pixels including PD14 and PD23) corresponding to two third color filters C are combined in a similar way. Further illustrations are omitted here for simplicity.

Figure 10A:
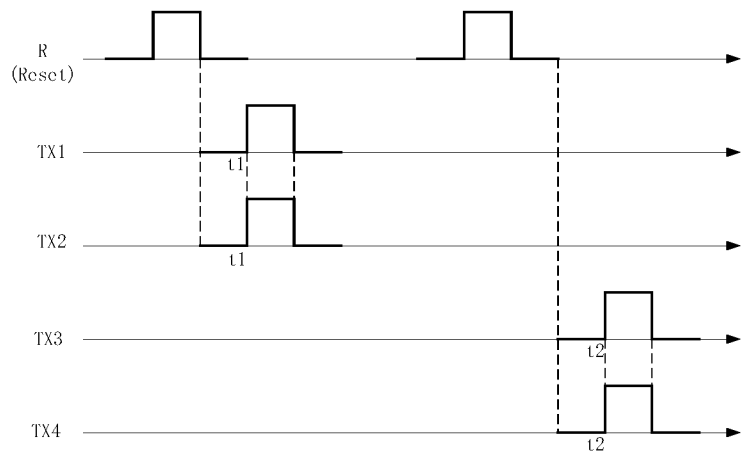
FIG. 10A and FIG. 10B depict waveforms for explaining the working mechanism of an image sensor according to some embodiments embodiment of the present disclosure.

Because the pixels 120 corresponding the color filters 110 of all colors in the same color filter set 113 shares a floating diffusion node 1-D, if all the control ends TX of the exposure control circuits TRF of all pixels 120, then the electrical signals generated by the pixels 120 corresponding to color filters 110 of different colors are combined. In order to avoid this situation, as shown in FIG. 10A, in the same color filter set 113, the control ends TX of the exposure control circuits TRF of the pixels 120 corresponding to the color filters 110 of different colors should be turned on at different time. It should be noted that in the embodiment shown in FIG. 10A, the control ends TX1 and TX2 of the two pixels 120 corresponding to the first color filters A are first turned on. In another embodiment, the control ends TX3 and TX4 of the two pixels 120 corresponding to the second color filters B could be first turned on. This change also falls within the scope of the present disclosure.

Figure 11:
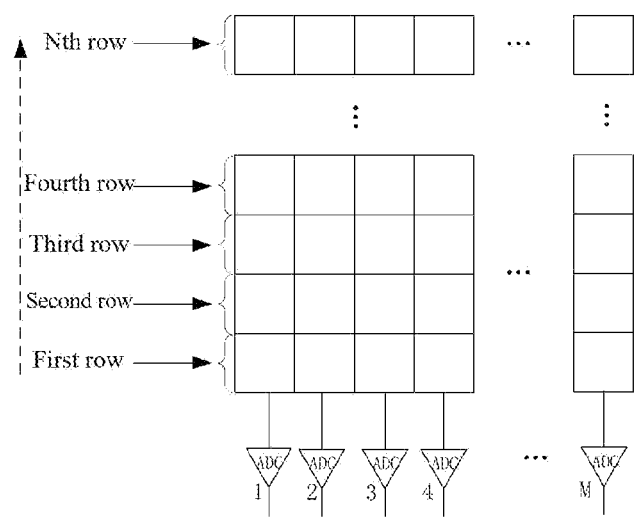
FIG. 11 depicts ADCs performing analog-to-digital conversions according to the conventional art.

Please refer to FIG. 11. The image sensor often comprises ADCs. Assume that the pixel array comprises N*M pixels. The number of the ADCs is M. That is, a column of pixels corresponds to an ADC. When the ADCs are performing the analog-to-digital conversions, The M ADCs first simultaneously perform the analog-to-digital conversions on the analog signals outputted by the pixels of the first row, and then the M ADCs first simultaneously perform the analog-to-digital conversions on the analog signals outputted by the pixels of the second row, and then the M ADCs first simultaneously perform the analog-to-digital conversions on the analog signals outputted by the pixels of the third row, and so on. At last, the M ADCs first simultaneously perform the analog-to-digital conversions on the analog signals outputted by the pixels of the $N^{th}$ row. Assume that it requires a period of time t0 to perform analog-to-digital conversions on each row. Then, the M ADCs needs to consume a time period N*t0 to perform analog-to-digital conversions on N*M analog pixel signals of all pixels.

Figure 12:
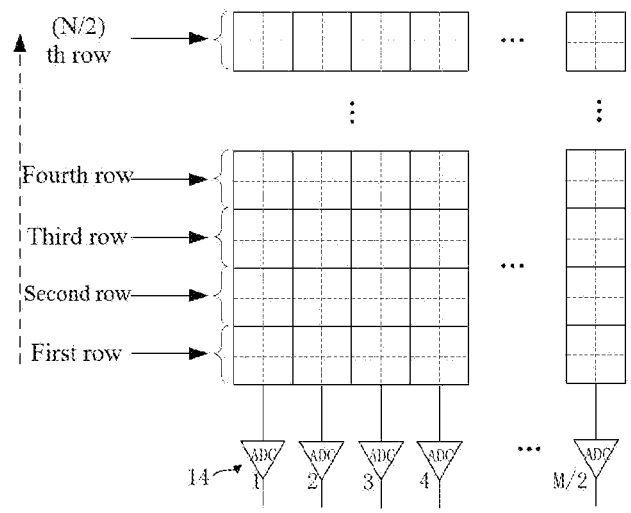
FIG. 12 depicts ADCs performing analog-to-digital conversions according to an embodiment of the present disclosure.

Please refer to FIG. 1, FIG. 7 and FIG. 12. According to an embodiment of the present disclosure, the image sensor 10 combines the electrical signals outputted by the pixels 120 through the shared floating diffusion node FD to obtain the combined analog pixel signal. When the pixel array 12 comprises N*M pixels and the number of the ADCs 14 could be M/S, the number of the analog pixel signals is reduced to be N*M/S because the electrical signals of the pixels 120 corresponding to the color filters 110 of the same color in the same color filter set 113 (as shown in FIG. 12, S=2 and S is determined by the number of the pixels 120 corresponding to the color filters 110 of the same color in the same color filter set 113). That is, S=number of the pixels 120 corresponding to the color filters 110 of the same color in the same color filter set 113. Then, the M/S ADCs 14 only needs N*t0/S to complete the analog-to-digital conversions of N*M/S analog pixel signals. This reduces the time consuming for analog-to-digital conversions. The frame rate of the image signal outputted by the image sensor 10 is related to the bandwidth of the I/F interface between the image sensor 10 and the processor and is also related to the time consuming for analog-to-digital conversions. Normally, if the data amount outputted by the image sensor 10 is greater, it is easier to result in the bandwidth bottleneck of the I/F interface such that the frame rate is reduced. Furthermore, if the time consuming for the analog-to-digital conversions is longer, the frame rate is lower as well. In this embodiment, the image sensor 10 uses the shared floating diffusion node FD to reduce the outputted data amount and thus could help raise the frame rate. Therefore, the image sensor 10 could have huge advantages when it is used in application such as a video chatting and/or a motion capture.

The ADC requires a certain time to convert the analog pixel signal into a digital signal. Conventionally, the image sensor needs to consume more time in the analog-to-digital conversion phase and thus could support a lower frame rate.

Figure 13:
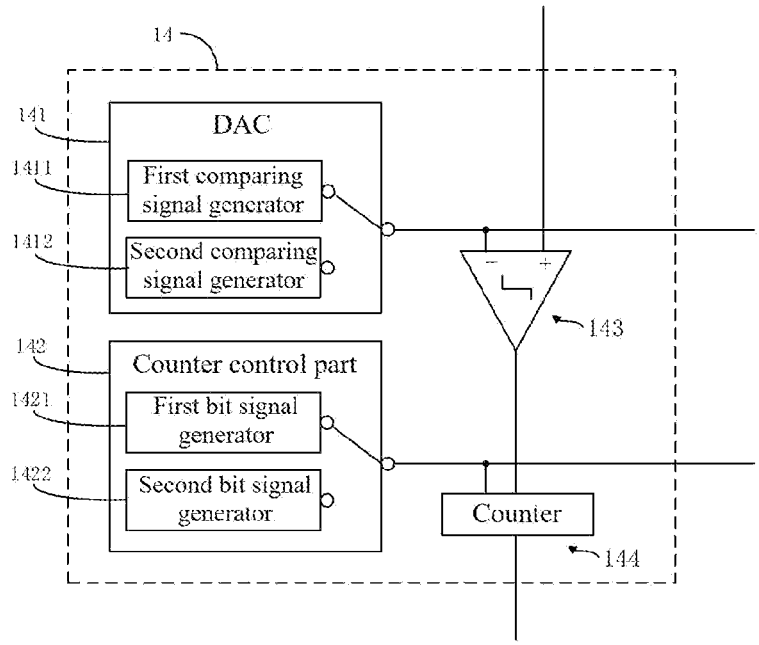
FIG. 13 is a diagram of an ADC according to an embodiment of the present disclosure.

Please refer to FIG. 13. According to an embodiment, the ADC 14 converts the analog pixel signal obtained by the pixels 120 corresponding to the first color filters A into a digital pixel signal based on a first bit precision. The ADC 14 converts the analog pixel signal obtained by the pixels 120 corresponding to the second color filters B and color filters C into a digital pixel signal based on a second bit precision, which is lower than the first bit precision. Compared with the first bit precision, the ADC 14 converts the analog pixel signal obtained by the pixels 120 corresponding to the second color filter B and color filters C into a digital pixel based on a lower bit precision. This could raise the efficiency of the analog-to-digital conversion, reduce the time consumption for the analog-to-digital conversion and raise the frame rate.

In the following disclosure, the first bit precision is a 10-bit precision and the second bit precision is an 8-bit precision as an example for illustration. The ADC 14 comprises a digital-to-analog converter (DAC) 141, a counter control part 142, a comparator 143 and a counter 144. The DAC 141 comprises a first comparing signal generator 1411 and a second comparing signal generator 1412. The counter control part 142 comprises a first bit signal generator 1421 and a second bit signal generator 1422.

When the ADC 14 converts the analog pixel signal obtained by the pixels 120 corresponding to the first color filters A into a digital pixel signal, the switch of the DAC 141 is connected to the first comparing signal generator 1411 and the switch of the counter control part 142 is connected to the first bit signal generator 1421. The reference voltage Vramp1 generated by the first comparing signal generator 1411 changes in a slope and is provided to the counter 144. The counter 144 performs the analog-to-digital conversion based on the 10-bit precision. The comparator 143 compares the reference voltage Vramp1 with the voltage signal Vinput of the ADC 14. Under the condition that the reference voltage Vramp1 is larger than the input voltage signal Vinput, the comparator 143 outputs "1" as its output signal and the counter 144 begins to count. When the reference voltage Vramp1 is reduced to be lower than the input voltage signal Vinput, the comparator 143 outputs "0" as its output signal and the counter 144 stops counting.

When the ADC 14 converts the analog pixel signal obtained by the pixels 120 corresponding to the second color filters B and the third color filters C into a digital pixel signal, the switch of the DAC 141 is connected to the second comparing signal generator 1412 and the switch of the counter control part 142 is connected to the second bit signal generator 1422. The reference voltage Vramp2 generated by the second comparing signal generator 1412 changes in a slope and is provided to the counter 144. The counter 144 performs the analog-to-digital conversion based on the 8-bit precision. The comparator 143 compares the reference voltage Vramp2 with the voltage signal Vinput of the ADC 14. Under the condition that the reference voltage Vramp2 is larger than the input voltage signal Vinput, the comparator 143 outputs "1" as its output signal and the counter 144 begins to count. When the reference voltage Vramp2 is reduced to be lower than the input voltage signal Vinput, the comparator 143 outputs "0" as its output signal and the counter 144 stops counting.

Figure 14A:
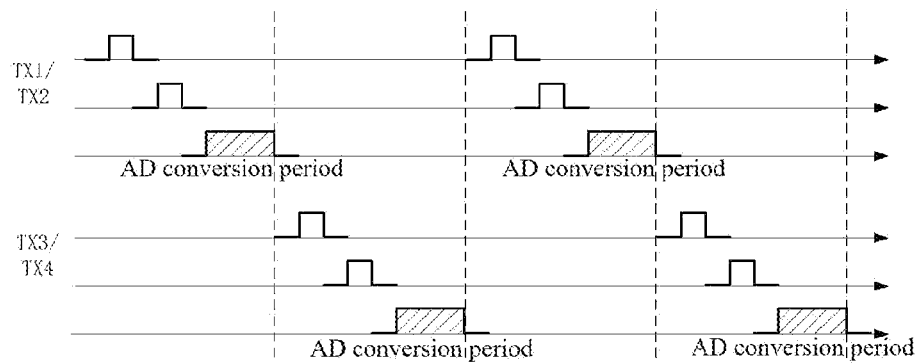
FIG. 14A depicts a time period for the ADC to perform the analog-to-digital conversion according to the conventional art.
Figure 14B:
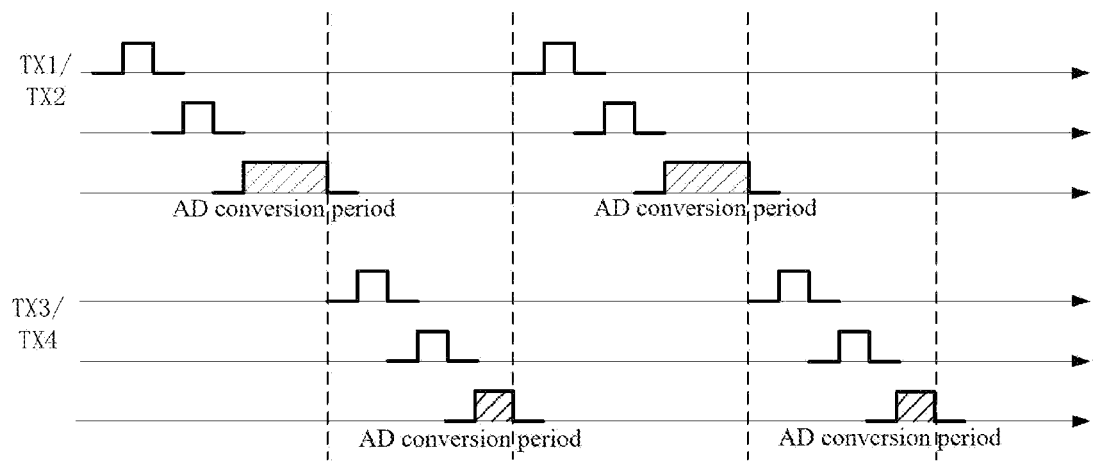
FIG. 14B depicts a time period for the ADC to perform the analog-to-digital conversion according to an embodiment of the present disclosure.

When the ADC 14 is working based on the 10-bit precision, the reference voltage Vramp1 varies $2^{10}=1024$ times. When the ADC 14 is working based on the 8-bit precision, the reference voltage Vramp2 varies $2^{8}=512$ times. Because the time period is determined by the circuit design, this means that the minimum time period is fixed. Therefore, the time for the ADC 14 to work based on the 10-bit precision is longer than the time for the ADC 14 to work based on the 8-bit precision. In an embodiment, the ADC 14 converts the analog pixel signal obtained by the pixels corresponding to the second color filters and the third color filters into a digital pixel signal based on the 8-bit precision (as shown in FIG. 14B). Compared with that ADC 14 converts the analog pixel signal obtained by the pixels corresponding to the second color filters and the third color filters into a digital pixel signal based on the 8-bit precision (as shown in FIG. 14A), it could raise the efficiency of the analog-to-digital conversions, reduce the time consumption for analog-to-digital conversions and raise the frame rate.

In some embodiments, the color filter array 11 (shown in FIG. 1) is divided into multiple regions. Each region comprises at least one color filter set 113 (shown in FIG. 3). The number of the color filter sets 113 could be determined by the target frame rate of the image corresponding to the image signal outputted by the image sensor 10. If the target frame rate is greater, the number of the color filter sets 113 in each region is smaller. The image sensor 10 could adapt itself to adjust the number of the color filter sets 113 in each region according to different target frame rate.

Please refer to FIG. 7. In an example, in all regions, the pixels corresponding to all the first color filters A in each region share one ADC 14. Each ADC 14 is used to convert the first analog pixel signal and/or the second analog pixel signal of the pixels 120 corresponding to all first color filters A into the first digital pixel signal. In all regions, the pixels 120 corresponding to the second color filters B in each region share one ADC 14. Each ADC 14 is used to convert the third analog pixel signal of the pixels 120 corresponding to all second color filters B into the second digital pixel signal; and/or the pixels 120 corresponding to the second color filters B in each region share one ADC 14. Each ADC 14 is used to convert the fourth analog pixel signal of the pixels 120 corresponding to all third color filters B into the third digital pixel signal.

Figure 15:
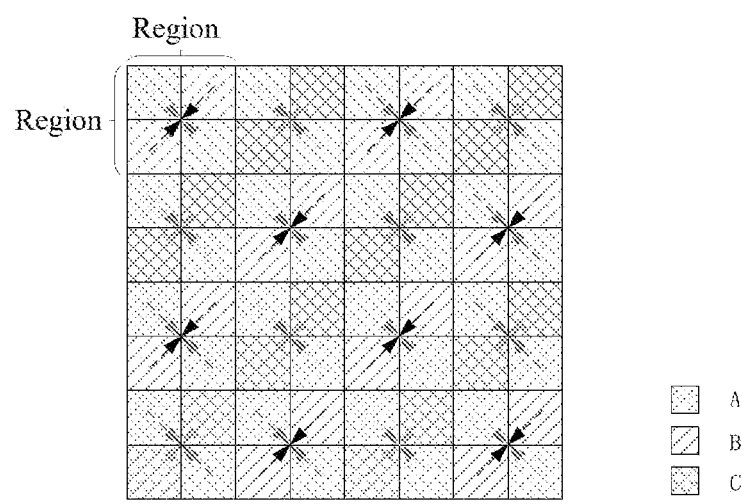
FIG. 15 and FIG. 16 depict the working mechanism of an image sensor according to some embodiments of the present disclosure.
Figure 15:
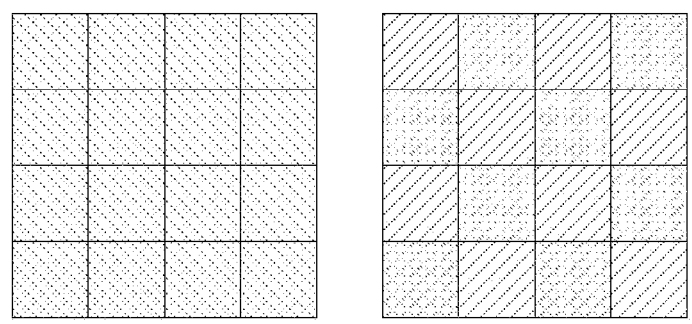

Please refer to FIG. 1, FIG. 3, FIG. 7, FIG. 8A, FIG. 8B and FIG. 15. Each region comprises a color filter set 113. The color filter set 113 in each region is the first color filter set 111 or the second color filter set 112. Taking the first color filter set 111 as an example, the two pixels 120 (the pixels including PD11 and PD22) corresponding to the first color filters A in the first color filter set 111 share one ADC 14. The two pixels 120 (the pixels including PD12 and PD21) corresponding to the second color filters B in the first color filter set 111 share one ADC 14. If the control ends TX1 and TX2 of the exposure control circuits of the two pixels 120 corresponding to the two first color filters A and the control ends TX3 and TX4 of the exposure control circuits of the two pixels 120 corresponding to the two second color filters B are turned on at the same time, then the control end T1 of the selection circuit SEL shared by the two pixels 120 corresponding to the two first color filters A and the control end T2 of the selection circuit SEL shared by the two pixels 120 corresponding to the two first color filters B could be turned on at the same time (as shown in FIG. 8A) or at different time (not shown). If the control ends TX1 and TX2 of the exposure control circuits of the two pixels 120 corresponding to the two first color filters A and the control ends TX3 and TX4 of the exposure control circuits of the two pixels 120 corresponding to the two second color filters B are turned on at different time, then the control end T1 of the selection circuit SEL shared by the two pixels 120 corresponding to the two first color filters A and the control end T2 of the selection circuit SEL shared by the two pixels 120 corresponding to the two first color filters B could be turned on at different time (as shown in FIG. 8B). When the image sensor 10 is working, the electrical signals of the two pixels 120 corresponding to the two first color filters A in the first color filter 111 are combined at the floating diffusion node FD. And then, the control end T1 of the selection circuit SEL shared by the two pixels 120 is turned on and the combined first analog pixel signal is transferred to the ADC 14 to be converted into a first digital pixel signal (as shown in FIG. 15, in the left bottom figure, a minimum A square corresponds to one first digital pixel signal). The first digital pixel signal is used to represent the value of a first color channel of a light applied to the pixels 120 corresponding to the first color filters A (the two first color filters A in one color filter set 113 shown in FIG. 15). The electrical signals of the two pixels 120 corresponding to the two second color filters B in the first color filter 111 are combined at the floating diffusion node FD. And then, the control end T2 of the selection circuit SEL shared by the two pixels 120 is turned on and the combined third analog pixel signal is transferred to the ADC 14 to be converted into a second digital pixel signal (as shown in FIG. 15, in the right bottom figure, a minimum B square corresponds to one first digital pixel signal). The second digital pixel signal is used to represent the value of a second color channel of a light applied to the pixels 120 corresponding to the second color filters B (the two first color filters B in one color filter set 113 shown in FIG. 15). In the second color filter set 112, the two pixels 120 corresponding to two first color filters A share one ADC 14 and the second analog pixel signal is converted to the first digital signal in a similar way. Further illustration is omitted here. Furthermore, in the second color filter set 112, the two pixels 120 corresponding to two third color filters C share one ADC 14 and the fourth analog pixel signal is converted to the third digital signal in a similar way. Further illustration is omitted here. Here, the third digital pixel signal is used to represent the value of a third color channel of a light applied to the pixels 120 corresponding to the third color filters C.

As shown in FIG. 15, the image sensor 10 could output two digital image signals. One digital image signal could comprise a plurality of first digital pixel signals and the other digital image signal could comprise a plurality of second digital pixel signals and a plurality of third digital pixel signals. The image corresponding to the digital image signals outputted by the image sensor 10 could have a target frame rate FP1.

Figure 10B:
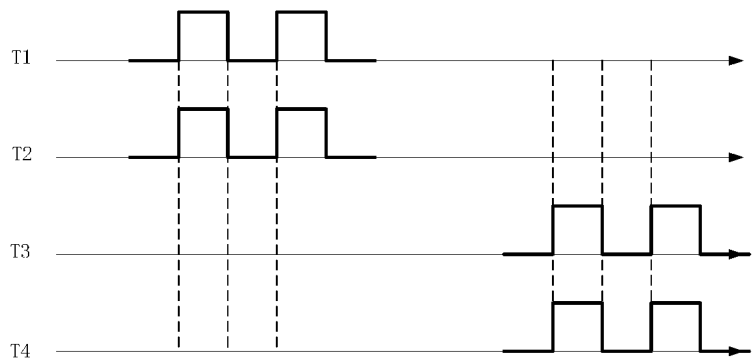

Please refer to FIG. 1, FIG. 3, FIG. 9, FIG. 10A, FIG. 10B and FIG. 16. Each region comprises at least one first color filter set 111 and at least one color filter set 112. In all regions, the pixels 120 corresponding to all the first color filters A, all the second color filters B and all the third color filters C in each region share one ADC 14. One selection circuit SEL is connected to one floating diffusion node FD and connected to one shared ADC 14. In the same region, the control ends of the selection circuits of the pixels 120 corresponding to different color filter sets 113 are turned on at different time. In the same color filter set 113, the control ends of the selection circuits SEL of the pixels 120 corresponding to the color filters 110 of different colors are turned on at different time. As shown in FIG. 14, each region comprises the first color filter sets 111 and the second color filter sets 112 corresponding to two columns of pixels 120 (two first color filter sets 111 and two second color filter sets 112). The four pixels 120 corresponding to the four first color filters A (the pixels including PD11, PD22, PD51 and PD62) in the two first color filter sets 111 and the four pixels 120 corresponding to the four first color filters A (the pixels including PD31, PD42, PD71 and PD82) in the two second color filter sets 112 share one ADC 14. The four pixels 120 corresponding to the four second color filters B (the pixels including PD12, PD21, PD52 and PD61) in the two first color filter sets 111 and the four pixels 120 corresponding to the four third color filters C (the pixels including PD32, PD41, PD72 and PD81) in the two second color filter sets 112 share one ADC 14. Because in the same first color filter set 111, the two pixels 120 corresponding to the two first color filters A and the two pixels 120 corresponding to the two second color filters B share one floating diffusion node FD, when the image sensor 10 is working, the electrical signals of the two pixels 120 (the pixels including PD11 and PD22) corresponding to the two first color filters A in one first color filter set 111 are combined at one floating diffusion node FD, the electrical signals of the two pixels 120 (the pixels including PD51 and PD62) corresponding to the two first color filters A in another first color filter set 111 are combined at another floating diffusion node FD, the electrical signals of the two pixels 120 (the pixels including PD31 and PD42) corresponding to the two first color filters A in one second color filter set 112 are combined at another floating diffusion node FD, and the electrical signals of the two pixels 120 (the pixels including PD71 and PD82) corresponding to the two first color filters A in another second color filter set 112 are combined at another floating diffusion node FD. And then, as shown in FIG. 9, FIG. 10B and the left bottom figure of FIG. 16, the control end T1 of the selection circuit SEL shared by the two pixels 120 corresponding to the two first color filters A in one first color filter 111, the control end T3 of the selection circuit SEL shared by the two pixels 120 corresponding to the two first color filters A in another first color filter set 111, the control end T1 of the selection circuit SEL shared by the two pixels 120 corresponding to the two first color filters A in one second color filter set 112 and the control end T3 of the selection circuit SEL shared by the two pixels 120 corresponding to the two first color filters A in another second color filter set 112 are turned on at different time. The combined two first analog pixel signals and combined two second analog pixel signals (in left bottom figure of FIG. 16, a minimum A square corresponds to one analog pixel signal or one second analog pixel signal) are transferred to the ADCs 14 shared by the 8 pixels (the pixels PD11, PD22, PD51, PD62, PD31, PD42, PD71 and PD 82) at different time to perform the analog-to-digital conversions at different time to obtain four first digital pixel signals (as shown in left bottom figure of FIG. 16, one minimum A square represents one first digital pixel signal). And then, as shown in FIG. 9, FIG. 10A and the top figure of FIG. 16, the electrical signals of the two pixels 120 (the pixels including PD12 and PD21) corresponding to the two second color filters B in one first color filter set 111 are combined at one floating diffusion node FD, the electrical signals of the two pixels 120 (the pixels including PD52 and PD61) corresponding to the two second color filters B in another first color filter set 111 are combined at another floating diffusion node FD. And then, as shown in FIG. 9, FIG. 10B and the right bottom figure of FIG. 16, the control end T1 of the selection circuit SEL shared by the two pixels corresponding to the two second color filters B in one first color filter set 111 and the control end T1 of the selection circuit SEL shared by the two pixels corresponding to the two second color filters B in another first color filter set 111 are turned on at different time. The combined two third analog pixel signals (in the right bottom figure in FIG. 16, the minimum B square corresponds a third analog pixel signal) are transferred to the ADC 14 shared by the four pixels 120 to be converted into two second digital signals (in the right bottom figure in FIG. 16, the minimum B square corresponds a second digital pixel signal). Similarly, the four pixels 120 corresponding to the four third color filters C in the two second color filter sets 112 share one ADC 14 to convert two fourth analog pixel signals into two third digital pixel signals. And the four pixels 120 corresponding to the four second color filters B in the two first color filter sets 111 share one ADC 14 to convert two third analog pixel signals into two second digital pixel signals. Further illustration is omitted here for simplicity.

Figure 16:
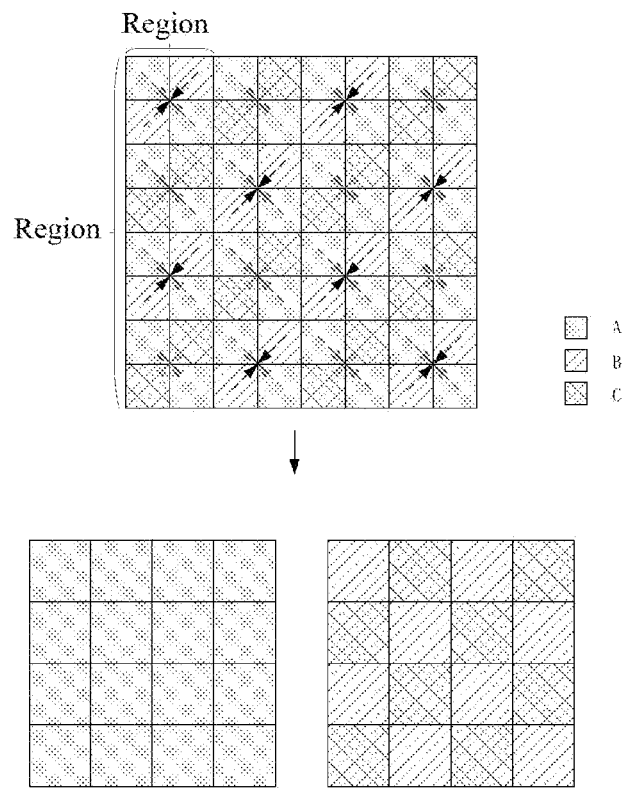

Accordingly, as shown in FIG. 16, the image sensor 10 could output two digital image signals. One digital image signal comprises a plurality of first digital pixel signals.

Another digital image signal comprises a plurality of second digital pixel signals and a plurality of third digital pixel signals. The image corresponding to the digital image signals outputted by the image sensor 10 could have a target frame rate FP2. Compared FIG. 15 with FIG. 16, in FIG. 16, each region comprise more color filter sets 113. That is, there are more color filter sets 113 sharing the same ADC 14. Thus, the ADC 14 needs more time to convert the analog pixel signals of pixels 120 corresponding to different color filter sets into digital pixel signals at different time. Therefore, the target frame rate FP2 in the embodiment shown in FIG. 16 is lower than the target frame rate FP1 in the embodiment shown in FIG. 15. From the above, it could be understood that the image sensor 10 of the present disclosure could adjust the number of the color filter sets 110 in each region according to the target frame rate such that the image sensor 10 could be adopted in different frame rates for different scene/demands and thus have a better scene adaptability.

Figure 17:
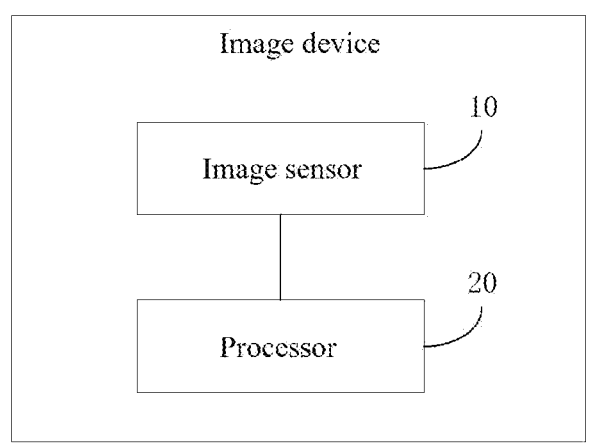
FIG. 17 is a diagram of an imaging device according to an embodiment of the present disclosure.

Please refer to FIG. 1 and FIG. 17. According to an embodiment of the present disclosure, an imaging device 100 is disclosed. The imaging device 100 comprises an image sensor 10 of any of the above embodiments.

In some embodiments, the imaging device 100 further comprises a processor 20. The processor 20 could process a first digital pixel signal representing a value of a first color channel of a light applied to pixels 120 corresponding to the first color filters A, to process a second digital pixel signal representing a value of a second color channel of a light applied to pixels 120 corresponding to the second color filters B, and to process a third digital pixel signal representing a value of a third color channel of a light applied to pixels 120 corresponding to the third color filter C, to generate a color image.

When the image sensor 10 outputs two digital image signals, the first digital image signal comprises a plurality of first digital pixel signals and the second digital image signal comprises a plurality of second digital pixels signals and a plurality of third pixel signals (such as the output shown in FIG. 15 and FIG. 16). In this case, the processor 20 first perform an interpolation process on the second digital image signal such that the pixels corresponding to each digital image signal have the second digital pixel signal representing a value of second color channels and the third digital pixel signal representing a value of third color channels. And then, the processor 20 combine the first digital image signal with the interpolated second digital image signal to generate a color image. In the color image, the digital pixel signal corresponding to each pixel is composed of the value of the first color channel, the value of the second color channel and the value of the third color channel.

Figure 18:
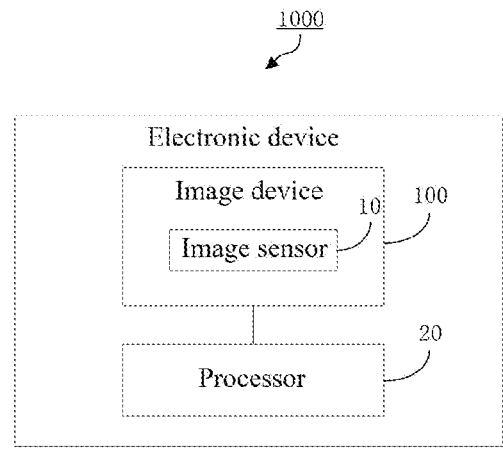
FIG. 18 is a diagram of an electronic device according to an embodiment of the present disclosure.

Please refer to FIG. 1, FIG. 3, and FIG. 18. According to an embodiment of the present disclosure, an electronic device 1000 is disclosed. The electronic device 1000 could be a cell phone, a tablet, a laptop, a smart phone, a smart ring, a smart helmet, a smart glasses, an unmanned device (such as a drone, a self-driving car or an unmanned boat), etc. The electronic device 1000 comprises an imaging device 100. The imaging device 100 comprises an image sensor of any of the above embodiments. The electronic device 1000 further comprises a processor 20. The processor 20 of the electronic device 1000 could perform the same functions of the processor 20 in the imaging device shown in FIG. 17. Further illustration is omitted here.

Figure 19:
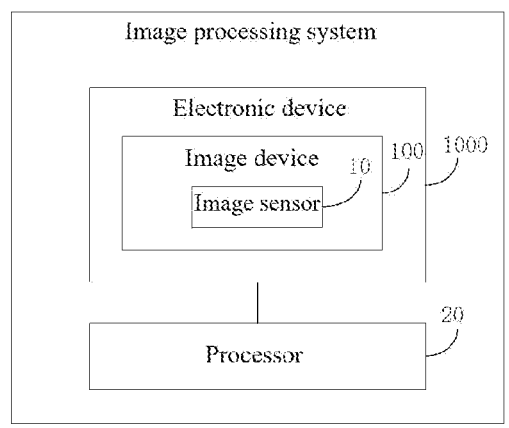
FIG. 19 is a diagram of an image processing system according to an embodiment of the present disclosure.

Please refer to FIG. 1, FIG. 3 and FIG. 19. According to an embodiment of the present disclosure, an image processing system 10000 is disclosed. The image processing system 10000 comprises an electronic device 1000. The electronic device 1000 comprises an imaging device 100. The imaging device 100 comprises an image sensor of any of the above embodiments. The processor 20 of image processing system 10000 could perform the same functions of the processor 20 in the imaging device shown in FIG. 17. Further illustration is omitted here.

The processor 20 could be placed in a server for cloud calculation and could be placed in a server for edge calculation. In this way, the pixel signal outputted by the image sensor 10 (shown in FIG. 1) could be downloaded to the server to be further processed. This could reduce the power consumption of the imaging device 100 or the electronic device 1000.

Please refer to FIG. 1, FIG. 3, FIG. 7 and FIG. 9. According to an embodiment of the present disclosure, a signal processing method is disclosed. The signal processing method could be used in the image sensor 10. The image sensor 10 comprises a color filter array 11, a pixel array 12 and a plurality of ADCs 14. The color filter array 11 comprises a plurality of first color filters A, a plurality of second color filters B and a plurality of third color filters C. The pixel array 12 comprises a plurality of pixels 120. Each pixel 120 is corresponding to a color filter 110 in the color filter array. The pixel 120 is used to receive a light passing through the color filter 110 to generate an electrical signal to obtain an analog pixel signal. The signal processing method comprises:

The ADC converts the analog pixel signal of the pixel 120 corresponding to the first color filter A based on a first bit precision into a digital pixel signal. The ADC 14 converts the analog pixel signal of the pixel 120 corresponding to the second color filter B and the third color filter C based on a second bit precision into a digital pixel signal. Here, the second bit precision is lower than the first bit precision.

In some embodiments, the color filter array 11 comprises a plurality of color filter sets 113. Each color filter set 113 comprises color filters 110 of at least two different colors. The color filters 110 of each color in each color filter set 113 are plural. The pixel array 12 further comprises floating diffusion nodes FD. In the same color filter set 113, the pixels 120 corresponding to the color filters 110 of the same color share one floating diffusion node PD. The signal processing method further comprises: controlling the electrical signals generated by the pixels 120 corresponding to the color filters 110 of the same color in the same color filter set 113 to be combined at the corresponding floating diffusion node FD.

In some embodiments, the color filter sets 113 comprise a plurality of first color filter sets 111 and a plurality of second color filter sets 112. The first color filter set 111 comprises a plurality of first color filters A and a plurality of second color filters B of the same number. The second color filter set 112 comprises a plurality of first color filters A and a plurality of third color filters C of the same number. The step of controlling the electrical signals generated by the pixels 120 corresponding to the color filters 110 of the same color in the same color filter set 113 to be combined at the corresponding floating diffusion node FD comprises: controlling the electrical signals generated by the pixels 120 corresponding to the first color filters A in each first color filter 111 to be combined at the floating diffusion node FD shared by the pixels 120 corresponding to the first color filters A in each first color filter 111 to generate a first analog pixel signal and controlling the electrical signals generated by the pixels 120 corresponding to the second color filters B in each first color filter 111 to be combined at the floating diffusion node FD shared by the pixels 120 corresponding to the second color filters B in each first color filter 111 to generate a third analog pixel signal; and controlling the electrical signals generated by the pixels 120 corresponding to the first color filters A in each second color filter 112 to be combined at the floating diffusion node FD shared by the pixels 120 corresponding to the first color filters A in each second color filter 112 to generate a second analog pixel signal and controlling the electrical signals generated by the pixels 120 corresponding to the third color filters C in each second color filter 112 to be combined at the floating diffusion node FD shared by the pixels 120 corresponding to the third color filters C in each second color filter 112 to generate a fourth analog pixel signal.

In some embodiments, in the same color filter set 113, the pixels corresponding to the color filters of all colors share one floating diffusion node FD. Each pixel 120 comprises an exposure control circuit TRF. In the same color filter set 113, the control ends TX of the exposure control circuits of the pixels 120 corresponding to the color filters 110 of the same color are turned on at the same time to transfer the charges generated by the pixels corresponding to the color filters 110 of the same color to the shared floating diffusion node. In the same color filter set 113, the control ends TX of the exposure control circuits TRF of the pixels corresponding to the color filters 110 of different colors are turned on at different time.

In some embodiments, the color filter array 11 comprises a plurality of regions. Each region comprises at least one color filter set 113. In all regions, the pixels corresponding to all first color filters A in each region share one ADC 14. In all regions, the pixels corresponding to all second color filters B in each region share one ADC 14 and/or the pixels corresponding to all third color filters C in each region share one ADC 14. The signal processing method further comprises: converting the first analog pixel signal and/or the second analog pixel signal of the pixels 120 corresponding to the first color filters A in each region of all regions into the first digital pixel signal; converting the third analog pixel signal of the pixels 120 corresponding to the second color filters B in each region of all regions into the second digital pixel signal; and/or converting the fourth analog pixel signal of the pixels 120 corresponding to the third color filters C in each region of all regions into the third digital pixel signal.

In some embodiments, each region comprises at least one first color filter set 111 and at least one second color filter set 112. In all regions, the pixels corresponding to all first color filters A, all second color filters B and all third color filters C of each region share one ADC 14. The pixel array 12 further comprises a selection circuit SEL. The selection circuit SEL is connected to the floating diffusion node FD and the shared ADC 14. In the same region, the control ends T of the selection circuits SEL of the pixels 120 corresponding to different color filter sets 113 are turned on at different time. In the same color filter set 113, the control ends T of the selection circuits SEL of the pixels 120 corresponding to the color filters of different color are turned on at different time.

In some embodiments, the first color filter A is a green color filter G, the second color filter B is a red color filter R, and the third color filter C is a blue color filter Bu.

In some embodiments, the signal processing method further comprises: processing a first digital pixel signal representing a value of a first color channel of a light applied to pixels 120 corresponding to the first color filters A, processing a second digital pixel signal representing a value of a second color channel of a light applied to pixels 120 corresponding to the second color filters B, and processing a third digital pixel signal representing a value of a third color channel of a light applied to pixels 120 corresponding to the third color filters C, to generate a color image.

The illustration for the image sensor 10 in the above embodiments could be also used for illustrating the signal processing method in this embodiment. Thus, further illustration is omitted here.

According to an embodiment of the present disclosure, a computer equipment is disclosed. The computer comprises an electronic device 1000 (as shown in FIG. 18) of any of the above embodiments.

Figure 20:
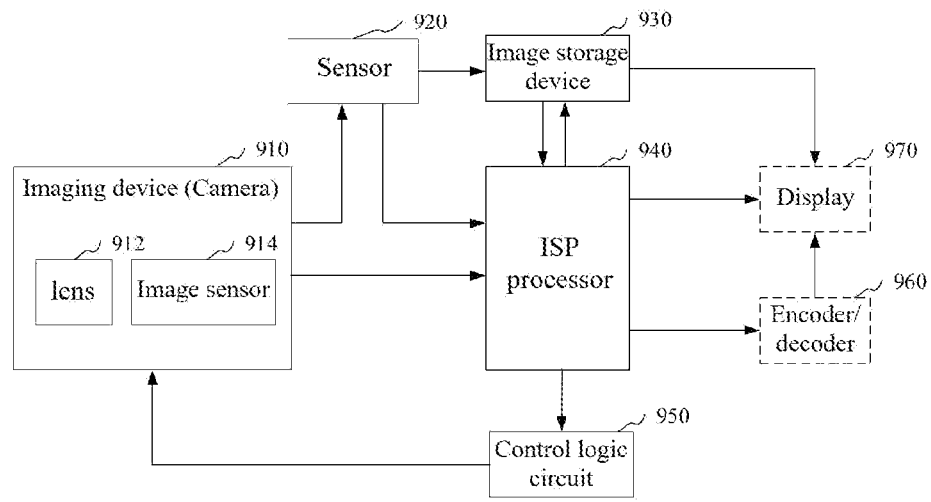
FIG. 20 is a diagram of an image processing circuit in a computer equipment according to an embodiment of the present disclosure.

The computer equipment comprises an image processing circuit. The image processing circuit could be implemented with hardware and/or software. The image processing circuit could comprise various processing units for defining ISP (image signal processing). FIG. 20 is a diagram of an image processing circuit according to an embodiment of the present disclosure. As shown in FIG. 20, only the elements related to the image processing technology according to an embodiment of the present disclosure are shown for illustration.

As shown in FIG. 20, the image processing circuit comprises an ISP processor 940 and a control logic circuit 950. Here, the ISP processor 940 could be used as a processor of the electronic device 1000. The image data captured by the imaging device 910 could be first processed by the ISP processor 940. The ISP processor 940 analyzes the image data to capture image statistics information capable of determining one or more control parameters of the imaging device 910. The imaging device 910 could comprise a camera having one or more lenses 912 and an image sensor 914. Here, the image sensor 914 could be the image sensor 10 (as shown in FIG. 1). The image sensor 914 could comprise a color filter array. The image sensor 914 could obtain the information about the light amplitude and wavelength captured by each pixel in the image sensor 914 and could provide original image data that could be processed by the ISP processor 940. The image data could comprise, for example, a plurality of first digital pixel signals, a plurality of second digital pixel signals and a plurality of third digital pixel signals. The sensor 920 (such as gyroscope) could provide the captured image processing parameter (such as stabilization parameter) to the ISP processor 940 based on the interface type of the sensor 920. The interface of the sensor 920 could be implemented with SMIA (Standard Mobile Imaging Architecture) interface, another serial or parallel camera interface, or a combination of the above-mentioned interfaces.

In addition, the image sensor 914 could send the original image data to the sensor 920. The sensor 920 could provide the original image data to the ISP processor 940 based on the interface type of the sensor 920. Or, the sensor 920 could store the original image data into the image storage device 930.

The ISP processor 940 could process the original image data pixel-by-pixel based on various formats. For example, each image pixel could have 8, 10, 12, or 14 bit depth. The ISP processor 940 could perform one or more image processing operations on the original image data and collect the statistic information about the image data. Here, the image processing operations could be performed based on the same or different bit depths.

The ISP processor 940 could further receive the image data from the image storage device 930. For example, the interface of the sensor 920 sends the original image data to the image storage device 930. The image storage device 930 then provides the original image data to the ISP processor 940 for further processing. The image storage device 930 could be part of a memory device, a storage equipment, or an independent storage device in an electronic device. The image storage device 930 could have a DMA (Direct Memory Access) characteristic.

When receiving the original image data from the interface of the image sensor 914, from the interface of the sensor 920 or from the image storage device 930, the ISP processor 940 could perform one or more image processing operations, such as time-domain filtering or processing the first digital pixel signal, the second digital pixel signal and the third digital pixel signal to obtain the color image. The processed image data (such as the color image) could be sent to the image storage device 930 such that the processed image data could be further processed before being displayed. The ISP processor 940 receives the processed data from the image storage device 930 and performs the image data processing on the processed data in the original domain and RGB and YCbCr color spaces. The image data processed by the ISP processor 940 could be sent to the image storage device 930. The display 970 could read the image data from the image storage device 930. In an embodiment, the image storage device 930 could be implemented with one or more frame buffers. In addition, the output of the ISP processor 940 could be sent to the encoder/decoder 960 to encode/decode the image data. The encoded image data could be stored and decoded/decompressed before being display on the display 970. The encoder/decoder 960 could be implemented with a CPU, a GPU or a coprocessor.

The statistic data determined by the ISP processor 940 could be sent to the control logic circuit 950. For example, the statistic data could comprise statistic information for the image sensor 914, such as auto-exposure parameter, auto-white-balance parameter, auto focus parameter, flash detection parameter, black voltage compensation parameter, and/or lens 912 shadow calibration parameter. The control logic circuit 950 could comprise a processor and/or a microcontroller that executes one or more programs (or firmware), statistic data for the one or more programs, the control parameters of the imaging device 910 and the ISP processor 940. For example, the control parameters of imaging device 910 could comprise control parameters of the sensor 920 (such as the gain, the integration time of the exposure control, and the stabilization parameter), the camera flash control parameter, the lens 912 control parameters (such as focus or zooming parameters), or the combination of the above parameters. The control parameters of the ISP processor 940 could comprise the gain level or color calibration matrix for auto white balance and color calibration (for example, in the RGB process) and the lens 912 shadow calibration parameters.

In the description of this specification, the description of the terms "one embodiment", "some embodiments", "examples", "specific examples", or "some examples", and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

Any process or method described in the flowchart or otherwise described herein may be understood to include one or more modules, fragments, or portions of code of an executable instruction to implement a particular logical function or process. In addition, the scope of at least one embodiment of the present disclosure includes additional implementations in which the functions may be performed in a sequence that is not shown or discussed, including in a substantially simultaneous manner or in the reverse order depending on the function involved, which is understood by those skilled in the art to which this present disclosure pertains.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. An image sensor, comprising:
    a color filter array, comprising a plurality of first color filters, a plurality of second color filters and a plurality of third color filters;
    a pixel array, comprising a plurality of pixels, wherein each of the pixels corresponds to a color filter of the color filter array and is configured to receive light passing through a corresponding color filter to generate an electrical signal to obtain an analog pixel signal; and
    a plurality of analog-to-digital converters (ADCs), configured to convert analog pixel signal obtained by the pixels corresponding to the first color filters into a digital pixel signal based on a first bit precision, and to convert analog pixel signal obtained by pixels corresponding to the second color filters and the third color filters into a digital pixel signal based on a second bit precision that is lower than the first bit precision.

2. The image sensor of claim 1, wherein the color filter array comprises a plurality of color filter sets, each of the color filter set comprises color filters of at least two different colors and the color filters in each of the color filter sets corresponding to each of the two different colors are plural;
    wherein the pixel array further comprises a plurality of floating diffusion nodes, the color filters of a same color in a same color filter set shares one floating diffusion node such that the electrical signals generated by the pixels corresponding to the color filters of the same color in the same color filter set are combined at the floating diffusion node.

3. The image sensor of claim 2, wherein the plurality of color filter sets comprises a plurality of first color filter sets and a plurality of second color filter set, the first color filter set comprises the first color filters and the second color filters of a same number, and the second color filter set comprises the first color filters and the third color filters of a same number;
    wherein the electrical signals generated by pixels corresponding to the plurality of first color filters in each of the first color filter set are combined at a floating diffusion node shared by the pixels corresponding to the plurality of first color filters to generate a first analog pixel signal; and the electrical signals generated by pixels corresponding to the plurality of second color filters in each of the first color filter set are combined at a floating diffusion node shared by the pixels corresponding to the plurality of first color filters to generate a third analog pixel signal; and wherein the electrical signals generated by pixels corresponding to the plurality of first color filters in each of the second color filter set are combined at a floating diffusion node shared by the pixels corresponding to the plurality of first color filters to generate a second analog pixel signal; and the electrical signals generated by pixels corresponding to the plurality of third color filters in each of the second color filter set are combined at a floating diffusion node shared by the pixels corresponding to the plurality of second color filters to generate a fourth analog pixel signal.

4. The image sensor of claim 3, wherein in a same color filter set, pixels corresponding to the color filters of all colors share a same floating diffusion node, and each of the pixels comprises an exposure control circuit;

wherein in the same color filter set, control ends of exposure control circuits of the pixels corresponding to the color filters of the same color are simultaneously turned on to transfer charges generated by the pixels corresponding to the color filters of the same color in the same color filter set after receiving light to the floating diffusion node shared by the pixels corresponding to the color filters of the same color; and wherein in the same color filter set, control ends of exposure control circuits of pixels corresponding to color filters of different colors are turned on at different time.

5. The image sensor of claim 3, wherein the color filter matrix comprises a plurality of regions, each of the regions comprises at least one color filter set;

wherein in each of the regions, pixels corresponding to all of the first color filters share an ADC of the plurality of ADCs, each of the ADCs is configured to convert the first analog signal and/or the second analog signal of the pixels corresponding to all of the first color filters in each of the regions to a first digital pixel signal; and wherein in each of the regions, pixels corresponding to all of the second color filters share an ADC of the plurality of ADCs, each of the ADCs is configured to convert the third analog signal of the pixels corresponding to all of the second color filters in each of the regions to a second digital pixel signal and/or pixels corresponding to all of the third color filters share an ADC of the plurality of ADCs, each of the ADCs is configured to convert the fourth analog signal of the pixels corresponding to all of the third color filters in each of the regions to a third digital pixel signal.

6. The image sensor of claim 5, wherein each of the regions comprises at least one first color filter set and at least one color filter set;

wherein pixels corresponding to the first color filters, the second color filters and the third color filters in each of the regions share an ADC;

wherein the pixel array further comprises a plurality of selection circuits, one selection circuit is electrically connected to one of the floating diffusion nodes and the shared ADC;

wherein in a same region, control ends of the selection circuits corresponding to pixels corresponding to different color filter sets are turned on at different time; and wherein in a same color filter set, control ends of the selection circuits corresponding to the pixels corresponding to different color filter sets are turned on at different time.

7. The image sensor of claim 1, wherein the first color filter is a green color filter, the second color filter is a red color filter, and the third color filter is a blue color filter.

8. The image sensor of claim 1, wherein the image sensor further comprises a micro lens array, and the micro lens array, the color filter array and the pixel array are orderly arranged along a light receiving direction of the image sensor.

9. An imaging device, comprising an image sensor, the image sensor comprising:

a color filter array, comprising a plurality of first color filters, a plurality of second color filters and a plurality of third color filters;

a pixel array, comprising a plurality of pixels, wherein each of the pixels corresponds to a color filter of the color filter array and is configured to receive light passing through a corresponding color filter to generate an electrical signal to obtain an analog pixel signal; and a plurality of analog-to-digital converters (ADCs), configured to convert analog pixel signal obtained by the pixels corresponding to the first color filters into a digital pixel signal based on a first bit precision and to convert analog pixel signal obtained by pixels corresponding to the second color filters and the third color filters into a digital pixel signal based on a second bit precision, which is lower than the first bit precision.

10. The imaging device of claim 9, further comprising:

a processor, configured to process a first digital pixel signal representing a value of a first color channel of a light applied to pixels corresponding to the first color filters, to process a second digital pixel signal representing a value of a second color channel of a light applied to pixels corresponding to the second color filters, and to process a third digital pixel signal representing a value of a third color channel of a light applied to pixels corresponding to the third color filter, to generate a color image.

11. The imaging device of claim 9, wherein the color filter array comprises a plurality of color filter sets, each of the color filter set comprises color filters of at least two different colors and the color filters in each of the color filter sets corresponding to each of the two different colors are plural;

wherein the pixel array further comprises a plurality of floating diffusion nodes, the color filters of a same color in a same color filter set shares one floating diffusion node such that the electrical signals generated by the pixels corresponding to the color filters of the same color in the same color filter set are combined at the floating diffusion node.

12. The imaging device of claim 11, wherein the plurality of color filter sets comprises a plurality of first color filter sets and a plurality of second color filter set, the first color filter set comprises the first color filters and the second color filters of a same number, and the second color filter set comprises the first color filters and the third color filters of a same number;

wherein the electrical signals generated by pixels corresponding to the plurality of first color filters in each of the first color filter set are combined at a floating diffusion node shared by the pixels corresponding to the plurality of first color filters to generate a first analog pixel signal; and the electrical signals generated by pixels corresponding to the plurality of second color filters in each of the first color filter set are combined at a floating diffusion node shared by the pixels corresponding to the plurality of first color filters to generate a third analog pixel signal; and wherein the electrical signals generated by pixels corresponding to the plurality of first color filters in each of the second color filter set are combined at a floating diffusion node shared by the pixels corresponding to the plurality of first color filters to generate a second analog pixel signal; and the electrical signals generated by pixels corresponding to the plurality of third color filters in each of the second color filter set are combined at a floating diffusion node shared by the pixels corresponding to the plurality of second color filters to generate a fourth analog pixel signal.

13. A signal processing method, operable in an image sensor, the image sensor comprising a color filter array, a pixel array and a plurality of ADCs; the color filter array comprising a plurality of first color filters, a plurality of second color filters and a plurality of third color filters; the pixel array comprising a plurality of pixels, wherein each of the pixels corresponds to a color filter of the color filter array and is configured to receive light passing through a corresponding color filter to generate an electrical signal to obtain an analog pixel signal; and the signal processing method comprising:

controlling the plurality of analog-to-digital converter (ADC) to convert analog pixel signal obtained by pixels corresponding to the first color filters into a digital pixel signal based on a first bit precision and to convert analog pixel signal obtained by pixels corresponding to the second color filters and the third color filters into a digital pixel signal based on a second bit precision, which is lower than the first bit precision.

14. The signal processing method of claim 13, wherein the color filter array comprises a plurality of color filter sets, each of the color filter set comprises color filters of at least two different colors and the color filters in each of the color filter set corresponding to each of the two different colors are plural; the pixel array further comprises a plurality of floating diffusion nodes, the color filters of a same color in a same color filter set shares one floating diffusion node; and the signal processing method further comprising:

controlling the electrical signals generated by the pixels corresponding to the color filters of the same color in the same color filter set to be combined at the floating diffusion node.

15. The signal processing method of claim 14, wherein the plurality of color filter sets comprises a plurality of first color filter sets and a plurality of second color filter set, the first color filter set comprises the first color filters and the second color filters of a same number, and the second color filter set comprises the first color filters and the third color filters of a same number; the controlling the electrical signals generated by the pixels corresponding to the color filters of the same color in the same color filter set to be combined at the floating diffusion node comprises:

combining, at a floating diffusion node shared by the pixels corresponding to the plurality of first color filters, the electrical signals generated by pixels corresponding to the plurality of first color filters in each of the first color filter set to generate a first analog pixel signal;

combining, at a floating diffusion node shared by the pixels corresponding to the plurality of first color filters, the electrical signals generated by pixels corresponding to the plurality of second color filters in each of the first color filter set to generate a third analog pixel signal;

combining, at a floating diffusion node shared by the pixels corresponding to the plurality of first color filters, the electrical signals generated by pixels corresponding to the plurality of first color filters in each of the second color filter set to generate a second analog pixel signal; and combining, at a floating diffusion node shared by the pixels corresponding to the plurality of second color filters, the electrical signals generated by pixels corresponding to the plurality of third color filters in each of the second color filter set to generate a fourth analog pixel signal.

16. The signal processing method of claim 15, wherein in a same color filter set, pixels corresponding to the color filters of all colors share a same floating diffusion node, and each of the pixels comprises an exposure control circuit;

wherein in the same color filter set, control ends of exposure control circuits of the pixels corresponding to the color filters of the same color are simultaneously turned on to transfer charges generated by the pixels corresponding to the color filters of the same color in the same color filter set after receiving light to the floating diffusion node shared by the pixels corresponding to the color filters of the same color; and wherein in the same color filter set, control ends of exposure control circuits of pixels corresponding to color filters of different colors are turned on at different time.

17. The signal processing method of claim 15, wherein the color filter matrix comprises a plurality of regions, each of the regions comprises at least one color filter set;

wherein in each of the regions, pixels corresponding to all of the first color filters share an ADC of the plurality of ADCs, pixels corresponding to all of the second color filters share an ADC of the plurality of ADCs, and/or pixels corresponding to all of the third color filters share an ADC of the plurality of ADCs; the signal processing method further comprises:

converting, in each of the regions, the first analog signal and/or the second analog signal of the pixels corresponding to all of the first color filters to a first digital pixel signal; and converting, in each of the regions, the third analog signal of the pixels corresponding to all of the second color filters to a second digital pixel signal; and/or converting, in each of the regions, the fourth analog signal of the pixels corresponding to all of the third color filters to a third digital pixel signal.

18. The signal processing method of claim 17, wherein each of the regions comprises at least one first color filter set and at least one color filter set;

wherein pixels corresponding to the first color filters, the second color filters and the third color filters in each of the regions share an ADC;

wherein the pixel array further comprises a plurality of selection circuits, one selection circuit is electrically connected to one of the floating diffusion nodes and the shared ADC;

wherein in a same region, control ends of the selection circuits corresponding to pixels corresponding to different color filter sets are turned on at different time; and wherein in a same color filter set, control ends of the selection circuits corresponding to the pixels corresponding to different color filter sets are turned on at different time.

19. The signal processing method of claim 13, wherein the first color filter is a green color filter, the second color filter is a red color filter, and the third color filter is a blue color filter.

20. The signal processing method of claim 13, further comprising:

processing a first digital pixel signal representing a value of a first color channel of a light applied to pixels corresponding to the first color filters, processing a second digital pixel signal representing a value of a second color channel of a light applied to pixels corresponding to the second color filters, and processing a third digital pixel signal representing a value of a third color channel of a light applied to pixels corresponding to the third color filters, to generate a color image.

* * * * *